US008909612B2

(12) United States Patent
Baber et al.

(10) Patent No.: US 8,909,612 B2
(45) Date of Patent: Dec. 9, 2014

(54) METHOD, SYSTEM AND PROGRAM PRODUCT TO IMPROVE SOCIAL NETWORK SYSTEMS

(75) Inventors: Dorothy Anne Baber, Newtown, PA (US); Ethel Lynne Waymon, Newtown, PA (US); Ernest Todd Waymon, Newtown, PA (US)

(73) Assignee: Contacts Count, LLC, Newtown, PA (US)

( * ) Notice: Subject to any disclaimer, the term of this patent is extended or adjusted under 35 U.S.C. 154(b) by 241 days.

(21) Appl. No.: 13/294,846

(22) Filed: Nov. 11, 2011

(65) Prior Publication Data
US 2012/0124085 A1 May 17, 2012

Related U.S. Application Data

(60) Provisional application No. 61/413,114, filed on Nov. 12, 2010.

(51) Int. Cl.
 *G06F 17/30* (2006.01)
 *G06Q 10/10* (2012.01)
(52) U.S. Cl.
 CPC ..................... *G06Q 10/10* (2013.01)
 USPC .......................... 707/705; 707/706
(58) Field of Classification Search
 USPC ................................. 707/706, 707
 See application file for complete search history.

(56) References Cited

U.S. PATENT DOCUMENTS

| 7,023,979 | B1 * | 4/2006 | Wu et al. ................. 379/265.11 |
| 8,010,460 | B2 * | 8/2011 | Work et al. .................... 705/319 |
| 2004/0181665 | A1 * | 9/2004 | Houser ......................... 713/158 |
| 2010/0029250 | A1 * | 2/2010 | Gupta ........................... 455/413 |
| 2012/0222135 | A1 * | 8/2012 | Chavez ........................... 726/29 |
| 2013/0212033 | A1 * | 8/2013 | Work et al. .................... 705/321 |
| 2013/0290420 | A1 * | 10/2013 | Work et al. .................... 709/204 |
| 2013/0290448 | A1 * | 10/2013 | Work et al. .................... 709/206 |

OTHER PUBLICATIONS

Anne Baber and Lynne Waymon, "Make Your Contacts Count—Networking Know-How for Business and Career Success," $2^{nd}$ Edition, published by AMACOM, American Management Association, 2007.

* cited by examiner

*Primary Examiner* — Baoquoc N To
(74) *Attorney, Agent, or Firm* — Foley & Lardner LLP

(57) ABSTRACT

A method, system and program product for advancing a trust stage with a human contact, the method in embodiments comprising: adding for a user a new human contact to the one or more electronic databases; receiving and/or generating identification of a trust stage for the new human contact; receiving a project with project information comprising one or more parameters; receiving and/or determining one or more human contacts to associate with the project; determining for the user a set of next steps for advancing the trust stage for one of the human contacts associated with the project; determining if a predetermined one or more of the next steps have been performed; advancing the trust stage for the one human contact to a higher trust stage; and sending or having sent an electronic communication to the user about one or more next steps that are remaining.

20 Claims, 18 Drawing Sheets

FIG. 10

PORPOISE
Networking On Purpose

Home  Settings  Change Password  Logout

Projects  People  Stages  Next Steps  PORPOISE Plan  Help

List of People

Add Person

Manage PORPOISE Prompts >>

| Name | Stage | Projects | | To Do |
|---|---|---|---|---|
| Jim Nasium | To Be Identified | Select Projects | Projects | My Next Steps |
| Joe Blow | To Be Identified | Select Projects | Projects | My Next Steps |
| Steve Adore | To Be Identified | Select Projects | Projects | My Next Steps |
| Sue Smith | To Be Identified | Select Projects | Projects | My Next Steps |

METHOD, SYSTEM AND PROGRAM PRODUCT TO IMPROVE SOCIAL NETWORK SYSTEMS

RELATED APPLICATIONS

This application claims priority from Provisional Application U.S. Application 61/413,114 filed Nov. 12, 2010, which is incorporated herein by reference in its entirety for all purposes.

FIELD OF THE INVENTION

The present invention generally relates to a system, method and program product for improving social network systems and advancing trust stages with human contacts.

SUMMARY

In embodiments, a method for advancing a trust stage with a human contact, comprises: accessing as part of one or more of the following steps, using one or more computers, one or more electronic databases comprising information on a plurality of human contacts, with the information for a respective human contact comprising data on one or more selected from the group of employment information, the human contact's own respective contacts, one or more organizations to which the respective human contact is a member, a location attribute, a skill attribute, a respective trust stage of the human contact associated with a respective user, a date when the respective trust stage was reached with the respective user; adding for a user, using the one or more computers, a new human contact to the one or more electronic databases in response to an electronic input; receiving and/or generating, using the one or more computers, identification of a trust stage for the new human contact, wherein there are a plurality of trust stages reflecting increasing levels of trust between the user and the human contact; receiving, using the one or more computers, a project with project information comprising one or more parameters; receiving and/or determining, using the one or more computers, one or more human contacts to associate with the project; determining, using the one or more computers, for the user a set of next steps for advancing the trust stage in the one or more electronic databases, for one of the human contacts associated with the project, from a current trust stage to a next higher trust stage; receiving, using the one or more computers, data indicating that one or more of the next steps has been performed; determining, using the one or more computers, if a predetermined one or more of the next steps have been performed; if the predetermined one or more of the next steps has been performed, then using the one or more computers, to advance the trust stage for the one human contact with respect to the user in the one or more electronic databases to a higher trust stage or suggest to the user to advance the current trust stage to a new higher trust stage; determining, using the one or more computers, for the user a set of next steps for advancing the trust stage in the one or more electronic databases, for the one human contact associated with the project, from the new higher trust stage to a next higher trust stage; and sending or having sent, using the one or more computers and one or more networks, an electronic communication to the user about one or more next steps that are remaining to be performed with respect to the one human contact, when a predetermined time period has elapsed and/or based on one or more parameters.

In embodiments, the method may further comprise: advancing a next steps count for the respective one human contact for the user when the data is received indicating that one of the next steps has been performed, and wherein the determining if a predetermined one or more of the next steps has been performed comprises determining if the next steps count equals or exceed a predetermined number.

In embodiments, the receiving and/or determining one or more human contacts to associate with the project step comprises: searching the one or more electronic databases for information for the human contacts of the user and/or their respective contacts for information that matches at least one of the one or more parameters of the project information; and associating or suggesting to the user associating with the project, using the one or more computers, a one of the human contacts that matches one of the one or more parameters of the project information.

In embodiments, the receiving and/or generating of identification of a trust stage for the new human contact step may comprise providing data for electronic display to the user of a series of questions or attributes for each of a plurality of the trust stages, and an ability to select one of the trust stages.

In embodiments, the receiving and/or generating of identification of a trust stage for the new human contact step may comprise providing data for electronic display to the user of a series of questions for each of a plurality of the trust stages, where a trust stage is selected based on one or more answers to the series of questions.

In embodiments, the sending or having sent an electronic communication to the user about one or more next steps that are remaining to be performed may be performed for multiple human contacts of the user.

In embodiments, the step of sending or having sent an electronic communication to the user about one or more next steps may comprise: selecting, using the one or more computers, one or more human contact based at least in part on calendar data for a group meeting that the user or a human contact of the user may be attending and/or based at least in part on data indicating that the user and/or the human contact of the user will or has traveled to a particular location, and generating next steps for the respective one or more human contacts.

In embodiments, the method may further generating and making accessible electronically, using the one or more computers, a list of human contacts at a selected trust level.

In embodiments, the method may further comprise generating and making accessible electronically, using the one or more computers, a list of human contacts, with a number of next steps performed or to be performed for each of multiple of the human contacts.

In embodiments, the method may further comprise making accessible electronically, using the one or more computers, a plurality of video and/or audio and/or text tutorials on methods to increase a trust stage with a human contact.

In embodiments, the method may further comprise receiving, using the one or more computers, from the user a proposed next step associated with a trust stage higher than a current trust stage with one of the human contacts; and providing a level of risk and/or value from an electronic table, using the one or more computers, of taking the proposed next step associated with the trust stage higher than the current trust stage with the one human contact.

In embodiments, the sending or having sent an electronic communication to the user about one or more next steps that are remaining to be performed with respect to the one human contact may comprise: electronically searching or having searched, using the one or more computers, the one or more databases in response to an entry in an electronic calendar for a group meeting that the user or a human contact of the user may be attending and/or on calendar entry indicating that the user or a human contact of the user will or has traveled to a particular location; determining, using the one or more computers, one or more human contacts associated in the one or more databases with the group meeting or the particular location; and generating, using the one or more computers, one or more next steps remaining to be performed for these determined one or more human contacts; and sending or having sent an electronic communication to the user about the one or more next steps that are remaining to be performed for these determined one or more human contacts.

In embodiments, a system for advancing a trust stage with a human contact, comprises: one or more computers configured with programming code to perform the following steps: accessing as part of one or more of the following steps, using the one or more computers, one or more electronic databases comprising information on a plurality of human contacts, with the information for a respective human contact comprising data on one or more selected from the group of employment information, the human contact's own respective contacts, one or more organizations to which the respective human contact is a member, a location attribute, a skill attribute, a respective trust stage of the human contact associated with a respective user, a date when the respective trust stage was reached with the respective user; adding for a user, using the one or more computers, a new human contact to the one or more electronic databases in response to an electronic input; receiving and/or generating, using the one or more computers, identification of a trust stage for the new human contact, wherein there are a plurality of trust stages reflecting increasing levels of trust between the user and the human contact; receiving, using the one or more computers, a project with project information comprising one or more parameters; receiving and/or determining, using the one or more computers, one or more human contacts to associate with the project; determining, using the one or more computers, for the user a set of next steps for advancing the trust stage in the one or more electronic databases, for one of the human contacts associated with the project, from a current trust stage to a next higher trust stage; receiving, using the one or more computers, data indicating that one or more of the next steps has been performed; determining, using the one or more computers, if a predetermined one or more of the next steps have been performed; if the predetermined one or more of the next steps has been performed, then using the one or more computers, to advance the trust stage for the one human contact with respect to the user in the one or more electronic databases to a higher trust stage or suggest to the user to advance the current trust stage to a new higher trust stage; determining, using the one or more computers, for the user a set of next steps for advancing the trust stage in the one or more electronic databases, for the one human contact associated with the project, from the new higher trust stage to a next higher trust stage; and sending or having sent, using the one or more computers and one or more networks, an electronic communication to the user about one or more next steps that are remaining to be performed with respect to the one human contact, when a predetermined time period has elapsed and/or based on one or more parameters.

BRIEF DESCRIPTION OF THE DRAWINGS

The above and related objects, features and advantages of the present disclosure will be more fully understood by reference to the following detailed description, when taken in conjunction with the following figures, wherein:

FIG. 10 is a screenshot of a Home Page for embodiments of the invention.

FIG. 11 is a screenshot of a New Contacts Page.

FIG. 15 is a screenshot of a select projects page for a human contact.

FIG. 17 is a screenshot of a help and a risk page.

FIG. 18 is a screenshot of a page for next steps for a given human contact to advance a project.

DETAILED DESCRIPTION OF EMBODIMENTS

Figure 1:
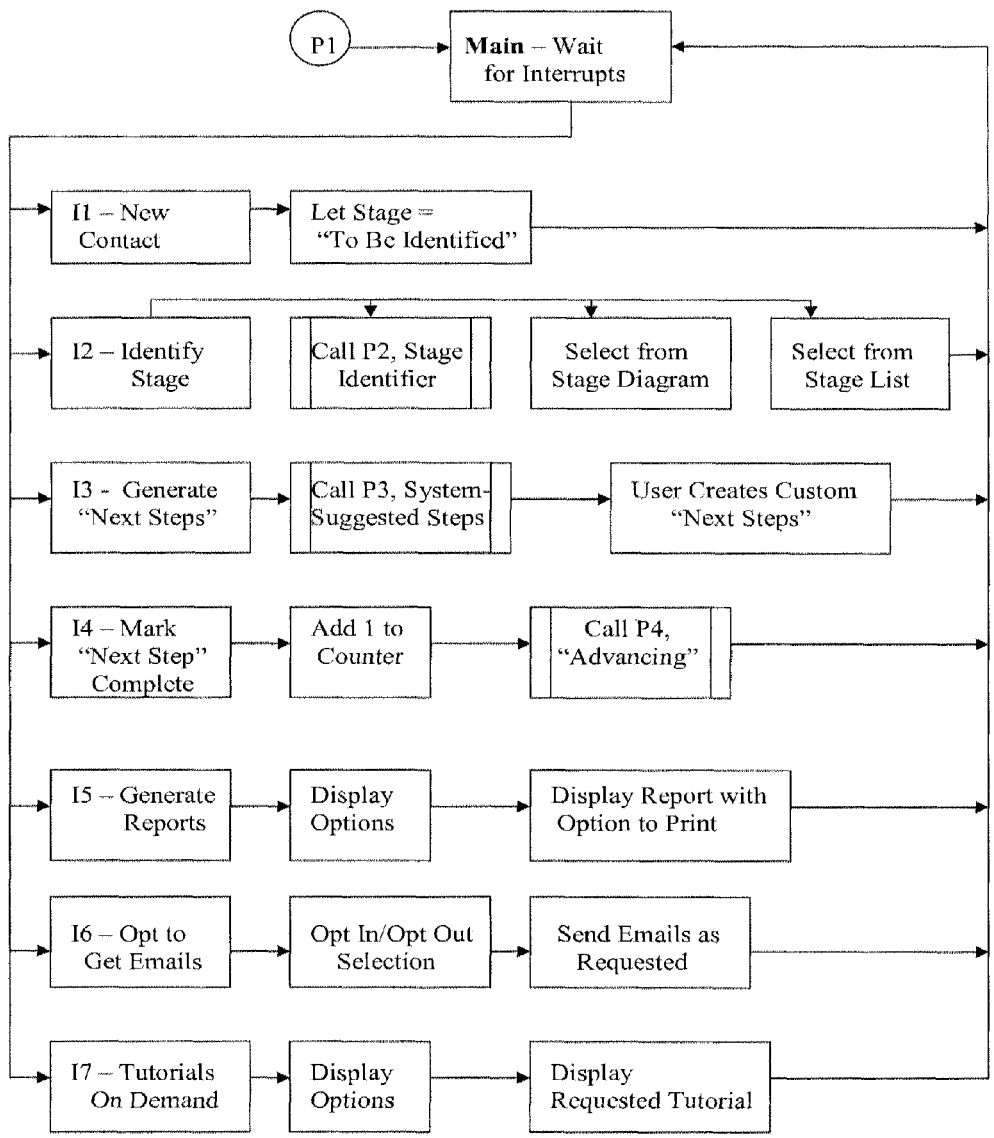
FIG. 1 is a schematic block diagram of a software interrupt configuration for embodiments of the invention.

Embodiments described generally relate to a system, method and program product for improving social network systems and advancing trust stages with human contacts.

The inventors have recognized the inaccuracy and resulting inefficiency of social-networking software systems, which are binary in nature, allowing one person (a Member) to be either a Contact of another Member or not. This all-or-nothing binary approach does not recognize that relationships develop in stages of trust and that the expectations and benefits of the relationship may be commensurate with the stage of trust between the individuals. Nor does the binary approach promote learning of a relationship-building process.

There are a variety of ways to define relationships between a user and his/her human contact, which may be used to implement embodiments of the invention. For example, one way of defining stages of a relationships for one or more embodiments is set forth in the reference "*Make Your Contacts Count*" (American Management Association, AMACOM, 2007, $2^{nd}$ Edition, see Ch. 4). This reference teaches how to build better relationships by managing a trust-building process with each human contact. The method recognizes stages of trust and teaches behavioral "Next Steps" to increase trust in the relationship.

Embodiments of the invention may be based on a model of building trust as a key to improving relationships. Every relationship exists at a certain Stage of Trust. Embodiments of the software recommend behaviors that teach a user's Contacts about his/her character and competence. This approach provides a more realistic and useful frame for social networking than binary systems.

DEFINITION OF TERMS

1. SNS: any "social networking software" system, public or private.

2. Member: a subscriber to an SNS.
3. User: may or may not be a member. In some instances, User and Member are used interchangeably.
4. Contact: any person with whom a Member has a relationship inside a SNS system.
5. Stages of a Relationship (also known as Trust Stages): may in embodiments be defined in a variety of different ways, with one way being per the book "*Make Your Contacts Count,*" 2$^{nd}$ Edition, published by AMACOM, American Management Association, 2007.
   a. "Accident (T1):" anyone the user has met and for whom the user has received contact information. The contact information may be entered into a database for a SNS for which the user is a Member as a Contact.
   b. "Associate (T2):" anyone who is a Member of a common Group with the user, either within the SNS or outside of it.
   c. "Active (T3):" The book uses the term "Actor" for this Stage. Embodiments of the software use the more descriptive "Active" to mean any Accident or Associate with whom at least one "Next Step" has been concluded, indicating that the user now has an Active relationship.
   d. "Advocate (T4):" any Active who is comfortable recommending the user to third parties and looking for opportunities for the user. In some embodiments, this may occur after six "Next Steps" have been performed.
   e. "Ally (T5):" An Ally may, in embodiments, be metaphorically a member of the user's own personal Board of Trustees, a trusted advisor, a close and trusted confidant and in embodiments.

Note that these definitions of trust stages may change in other embodiments of the trustnet system.
6. Advance: to move from one Stage of Relationship to another.

Figure 2:
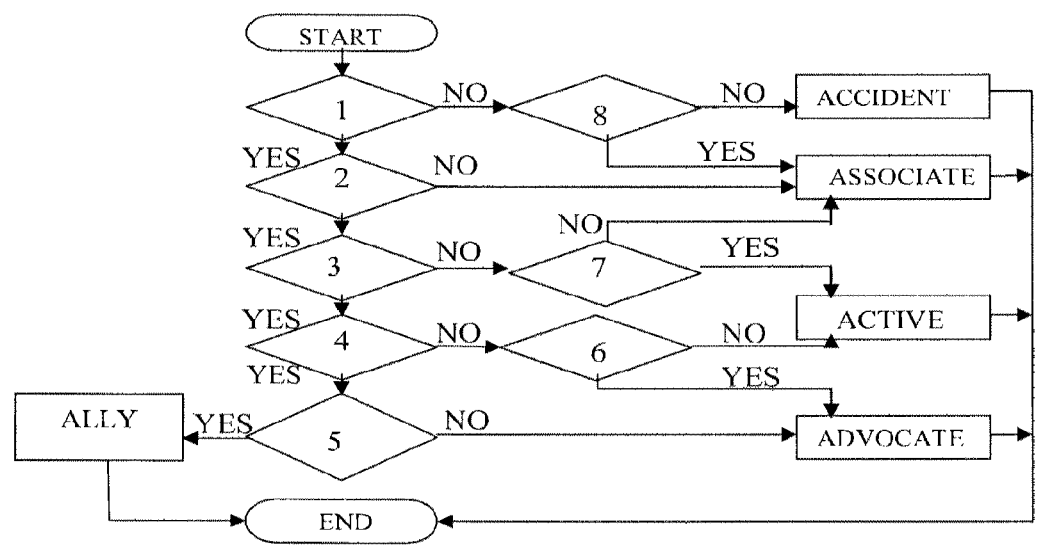
FIG. 2 is a schematic flow chart of a software logic tree for determining a trust stage.
Figure 3:
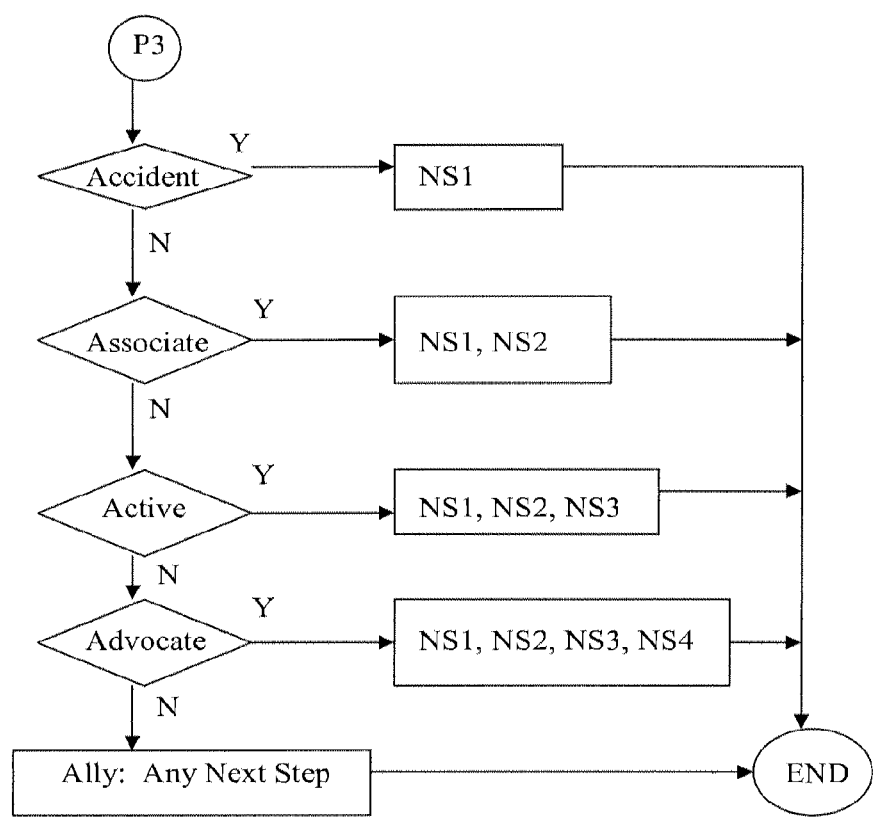
FIG. 3 is a schematic flow diagram of a next steps software logic tree.
Figure 4:
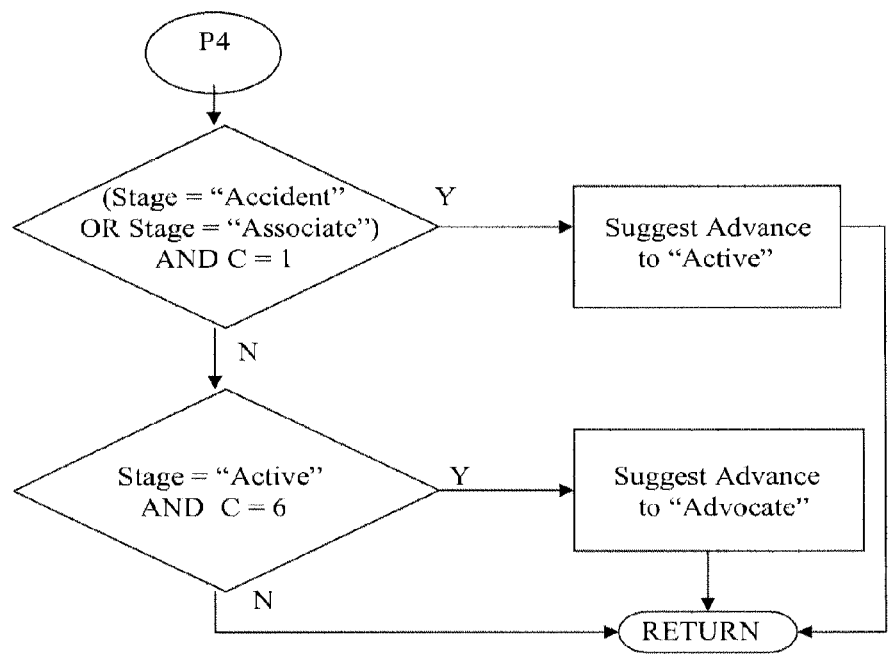
FIG. 4 is a schematic flow diagram of a software logic tree for suggesting advancement to a higher trust stage.

An "add-on" program may be provided for social networking software systems which, in one or more embodiments, has the following components.
   An Input Component: way(s) to input data relevant to ascertaining a Stage of Trust (T) between a Member (M) and each of that Member's Contacts (C), as well as names of Contacts, Next Steps with Targeted Completion Dates, Actual Completion Dates, an opt-in request for periodic reminders, etc.
   Example Processes for one or more embodiments are shown in FIG. 1, as follow:
      P1, Monitoring: awaiting Member's interrupts via selected activation of on-screen button, drop-down menu, or other indicator, such as a "hot-spot," on the screen. Seven example Interrupts (1-7) are illustrated and activate the following Processes. Note that in some embodiments, the trustnet system may also generate one or more of these processes based on data that it has received and/or calculated:
      Interrupt 1: Enter a new Contact and set Stage as "To Be Identified."
      Interrupt 2: P2, Stage Identification. New Users may use this Q&A logic routine to ascertain the Stage of their Relationship with a given Contact. As they become more familiar with the rules, the user may select the Trust Stage from a diagram or from a list instead of answering questions. Logic for an embodiment for this routine and flowchart is shown in FIG. 2, to be discussed below.
      Interrupt 3: P3, Suggesting "Next Steps." Depending on the Stage of the Relationship between a Member (M) and a Contact (C), the appropriate Next Steps toward building the relationship will vary. In embodiments, based on published research by Contacts Count LLC, the trustnet system may suggest appropriate "Next Steps" for the Member to take at a particular trust stage with Contact in order to further the Relationship. Examples may be found in a tutorials section of the previously referenced book. FIG. 3, to be discussed below, provides an example logic flow for presenting Next Steps to a user.
      Interrupt 4: P4, Advancing. Members are asked to indicate to the trustnet system when they have completed a Next Step. When they do so, the trustnet system in embodiments, may check to see if Advancement to a next Stage is to be suggested. Advancement to subsequent Stages of Relationship may be based on a predetermined number of those Next Steps completed. In embodiments, the trustnet system may maintain a count of the User's number of completed Next Steps with each of the user's Contacts, according to this logic and FIG. 4. In embodiments, advancement may be suggested based on completion of one or more predetermined high value next steps. The logic of FIG. 4 is as follows:
         Advance 1 (A1): If the Stage of Trust, T, between Member and Contact is at Accident or Associate level, then if Member completes one Next Step with Contact (see the diamond block 400), then the trustnet system may suggest to Member that he or she may advance the Relationship to Active (see block 410).
         Advance 2 (A2): If the trust stage is at Associate and Member completes a predetermined number of additional Next Steps with Contact, e.g., 6 Next Steps, or if selected predetermined Next Steps have been completed (see the diamond block 420), then the trustnet system may suggest that the user may advance the Relationship to Advocate (see block 430).
         Advance 3 (A3): If the Trust Stage is at an Advocate level and the Relationship between Member and Contact reaches the criteria set forth in the Stages of Relationship logic tree of FIG. 2, then the Member may consider calling the Relationship one of Allies. See FIG. 12.
      Note that in embodiments, one or more of the decisions to trigger advancements to the next trust stage level may be based on personal evaluations. In embodiments, one or more of the decisions to trigger advancement to the next trust stage level may be made by the trustnet system automatically as a default, and/or may be presented to the user for confirmation. In embodiments, it is not contemplated to obtain a concurrence of the other party, and these Trust Stage evaluations may be maintained private. In other embodiments, one or more proposed advancements to a higher Trust Stage may be set in the trustnet system to trigger sending a request for a concurrence from the respective contact, and may not permit the proposed advancement to that Trust Stage without receiving such concurrence.
      Interrupt 5: For Generating Reports on Contacts: This interrupt displays a screen to select one of several Reports, based one or more parameters, such as a number of contacts associated with a given project, a number of Contacts at a selected Trust Stage level, a listing of Contacts with a number of Next Steps performed by the user with respect to the given Contact.

Interrupt 6: Electronic communication: Allows a User to elect to receive/cancel a regular reminder email, text message or other electronic communication relating to his/her personal list of Contacts, Next Steps, and Targeted Completion Dates, to name a few. These electronic communications may be triggered using a variety of parameters, such as an elapsed time since a last interaction with a respective contact, or remaining at a Trust Stage level for a period of time that exceeds a threshold period of time, e.g., one or more days, one or more weeks, one or more months, to name a few. Another example trigger for an electronic communication may be a change in the one or more databases for information of the user. Another example trigger for an electronic communication may be a calendar entry for the user to attend a group meeting or to travel to a given location. Another example trigger for an electronic communication may be a change of data held in the one or more databases for a respective contact, such one or more new contacts or a new job, or a new location, or a new work assignment, for that contact. Another example trigger for an electronic communication may be entry of a new project by the user into the trustnet system with project parameters that coincide with one or more parameters in the data held in the one or more databases for the respective contact.

Interrupt 7: Coaching: In embodiments, the trustnet system may feature strategically-placed access to video and/or audio and/or text tutorial information on recommended personal behaviors to follow to
maintain a given Stage of Trust and/or
for all Stages of Trust except the Ally stage, advance the Stage of Trust.

Storage: one or more databases may be accessed, or may be maintained, that store trust-related data about each of the Member's Contacts, including but not limited to the Stage of Trust, the date that each Stage was achieved, the cumulative count of Next Steps completed, etc.

Accordingly, using embodiments of the present trustnet system with a social networking System (SNS) may include the following electronic operations.

P1. Monitoring. In embodiments, the trustnet system monitors for inputs from the Member, M, noting the following interrupts: Interrupt 1: to add a new Contact, Interrupt 2: to identify the Stage of a Relationship with a Contact (either initially or later), Interrupt 3: to select system-suggested Next Steps with a Contact or create ones of their own, Interrupt 4: to advance to a new Stage of the Relationship, Interrupt 5: to request a report, summarizing these data in several ways, Interrupt 6: to request a periodic email reminder of Next Steps, Interrupt 7: to provide access to "Coaching" tutorials about the relationship-building process.

When the Member (User) activates any of these seven interrupts (by selecting from a Navigation Bar or buttons conveniently located in appropriate locations), the trustnet system presents the page with that function.

If a User elects, he or she may request that the trustnet system send a regular (e.g., once a week, once a month, etc.) electronic communication report listing one or more Contacts (with Stage of Relationship), Next Steps coming due in the next period, and the Targeted Completion Date for each Next Step.

In some embodiments, Projects may be included, to which the User attaches Contacts for the purpose of furthering progress on the particular Project. In embodiments, the project may include one or more project parameters. Example projects may be: to get a promotion to a next level in a company, to move to Virginia, to find a new job as an engineer, to find a job in Virginia, to name a few.

Coaching. Embodiments of the trustnet system with the Trust Stages may encourage Members to build their relationships in general, and/or to advance one or more projects. The trustnet system in embodiments provides access to Coaching tutorials on recommended ways to build trust relationships from one stage to the next by demonstrating character and competence in appropriate venues and in appropriate ways.

The trustnet system, in embodiments, may provide information for use by members of a host social network system (SNS) in many ways, for example:
to analyze links to others by the Stages of Trust,
to prioritize multiple chains of links based on the "strength" of Trust in each (for example, a chain of three Advocates, where the user may only have one advocate contact, but that advocate contact may have his own advocate contact, and that advocate contact may has its own advocate contact, e.g., a 3 level chain of advocates, would be stronger than a chain of three Associates),
to count, display and/or list a user's contacts according to a Trust Stage of Relationship,
to analyze one's network of relationships in various ways (e.g.,: show a user's Advocates in chronological order, or show a user's "Actives" grouped by number of interactions or grouped by another parameter, such as a same company, or a same industry, or show all a user's Advocates in a location, e.g., Atlanta, to name a few.),
to do aggregate analyses.

In embodiments, the trustnet system may be implemented within a client social network system (SNS) in various ways. For example, a suite of software components may be provided comprising an API (Application Programming Interface), and necessary database structures and elements that may be used in embodiments to support it. The database may enable customers to enhance their design and the API may enable implementing trustnet system features and incorporating such functions into their existing code base.

In embodiments used within a client SNS, the software may be implemented so that users may not receive a standalone prompt, but may continue to use the client SNS's familiar interface (e.g., a LinkedIn page), which may present new TrustNet features on the client API, interrupts, etc., related to embodiments described herein.

In embodiments, Members may be able to classify their Contacts strategically and pursue goal oriented relationship building. Rules for Trust Stage Identification may use a Member's responses to subjective questions to obtain an appropriate current Trust Stage, and the resulting current Trust Stage may point to a set of suggested Next Steps for the Member to take with a particular Contact in order to advance that Trust Stage to a higher Trust Stage level. The trustnet system software may augment value in the form of making available educational tutorials, and action guides.

In embodiments, educational tutorials may be made accessible in a variety of user-friendly formats: videos, podcasts, vignettes, audio, text, etc. In embodiments, this component may serve as an entry point for periodic updates. Each tutorial may clearly define a relationship Stage and videos may feature dramatizations to illustrate a point.

Action guides may provide help on topics like what specific actions may be taken to take a relationship to next Stage. Such action guides may be updated periodically.

In embodiments, the software API for the present trustnet system may provide features for users to implement queries and reports as they would like. In embodiments, the presentation of information may be customized to suit the customer's interface, and ambience.

In embodiments, whenever a Member adds a new Contact, the trustnet system "Trust Stage Identification" feature may automatically be displayed as part of profile information capture.

Referring now to FIG. 2, an embodiment of a logic tree is illustrated for ascertaining a proper Trust Stage of a relationship with a particular Contact.

```
[Start] = Enter Contact's Name.
Go to Diamond : IF ": Question: Am I likely to come in contact with [Contact] again?"
    NO: THEN Go to diamond 8; If YES: Go to diamond 2:
    Diamond 2: IF "Do [Contact] and I regularly exchange information and tips?" NO:
THEN list as an Associate Trust Stage; If YES: THEN Go to diamond 3;
        Diamond 3: IF "Does [Contact] fully believe in my Character &
Competence?" If NO: Then Go to diamond 7. If YES, THEN go to diamond 4;
            Diamond 4: IF "Do [Contact] and I share our personal and professional
lives, keep confidences, commiserate & celebrate together?" If NO, THEN Go to diamond 6;
If YES: THEN Go to diamond 5;
                Diamond 5: IF "Do [Contact] and I tell each other the hard truth and
                    share input on life goals?" If NO, then list as an ADOCATE
Trust Stage, If YES, THEN list Trust Stage = "ALLY."
                Diamond 6: IF "Does [Contact] recommend me without reservation"?
                        YES, THEN list as Trust Stage = "ADVOCATE."
                    ELSE list as Trust Stage = "ACTIVE."
                Diamond 7: IF "Can [Contact] introduce me accurately?" YES, THEN list
Trust Stage as= "ACTIVE."
            ELSE list as Trust Stage = "ASSOCIATE."
            Diamond 8: IF "Are [Contact] and I members of a common group?" YES,
THEN list as Trust Stage = "ASSOCIATE."
            ELSE list as Trust Stage = "ACCIDENT."
ENDIF.
```

Appropriate actions to take to build and support a Relationship with a Contact depend on the Stage of Relationship that a user has with a Contact. Referring to FIG. 3, in embodiments, the trustnet system may make suggestions for Next Steps depending on the Stage, as follows:

If the Trust Stage is listed as Accident, then Next Steps list 300 comprising NS1 may be appropriate.

If the Trust Stage is listed as Associate, then Next Steps lists 310 comprising NS1 and NS2 may be appropriate.

If the Trust Stage is listed as Active, then Next Steps lists 320 comprising NS1, NS2 and NS3 may be appropriate.

If the Trust Stage is listed as Advocate, then Next Steps lists 330 comprising NS1 through NS4 may be appropriate.

If the Trust Stage is listed as Ally, then Next Steps lists 340 comprising NS1 through NS5 may be appropriate.

Referring to FIG. 4, in embodiments this process may be invoked when a Next Step counter has been incremented. A Count, C, of Next Steps performed at a specific Trust Stage may be used to trigger specific "Advances" to subsequent Trust Stages. If appropriate, the trustnet system in embodiments may issue a prompt to the User, such as "You have now completed X Next Steps in your [Stage] Relationship with [Contact]. Are you ready now to identify your Relationship as [Stage+1]?" In other embodiments, the trustnet system may automatically advance the Trust Stage to the next Trust Stage level, and provide an opportunity to the user to nullify the advance.

Figure 6:
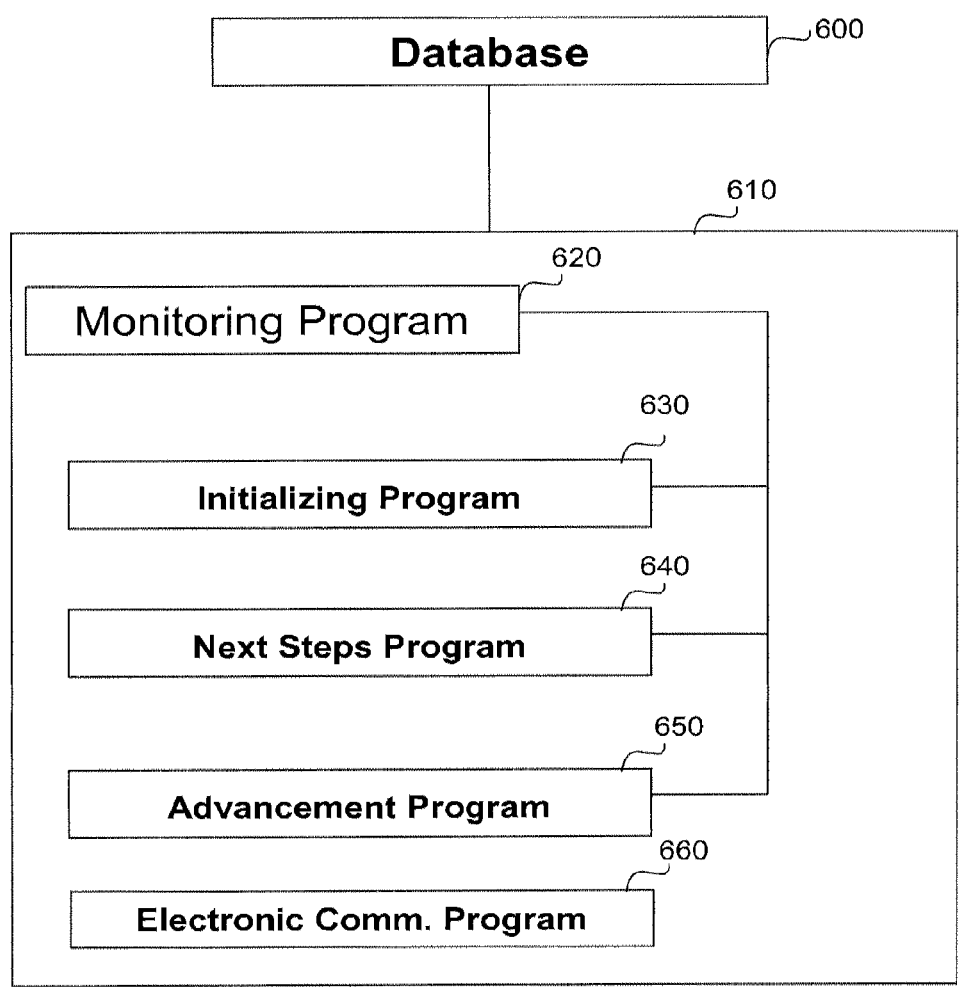
FIG. 6 is a schematic diagram of an example signal flow between an embodiment of the system, a social network system and a user.

One non-limiting embodiment of a trustnet system for implementing the invention is shown in FIG. 6 and comprises one or more electronic databases 600 and one or more computers 610. In an embodiment, the one or more electronic databases 600, stored on one or more computer-readable media, comprise relationship level data, and member input data, contact data, a next steps performed count, next steps suggested, and other data-items as needed to fit and/or configure with a social network system.

The one or more computers 610 for the trustnet system, in embodiments, are operatively connected/accessible to computer-readable program code stored in memory, and are capable of loading and executing that program code to configure the one or more computers into one or more special-purpose machines. The code, in embodiments, may be comprised of programs that implement functional components in the one or more computers. These components or modules may be stored separately or in combination. In the embodiment shown in FIG. 6, the one or more computers 610 are configured, with program code 620 for an embodiment of a monitoring program P1 for detecting interrupts, program code 630 for an embodiment of an initializing program for adding a new contact and identifying an appropriate current trust stage, program code 640 for an embodiment of program for generating next steps, program code 650 for an embodiment of a program for advancement which may include a value/risk assessment, and program code 660 for an embodiment of a program for initiating electronic communications. Various other program code may also be included such as a reports program module, a tutorials program module, to name a few.

Figure 9:
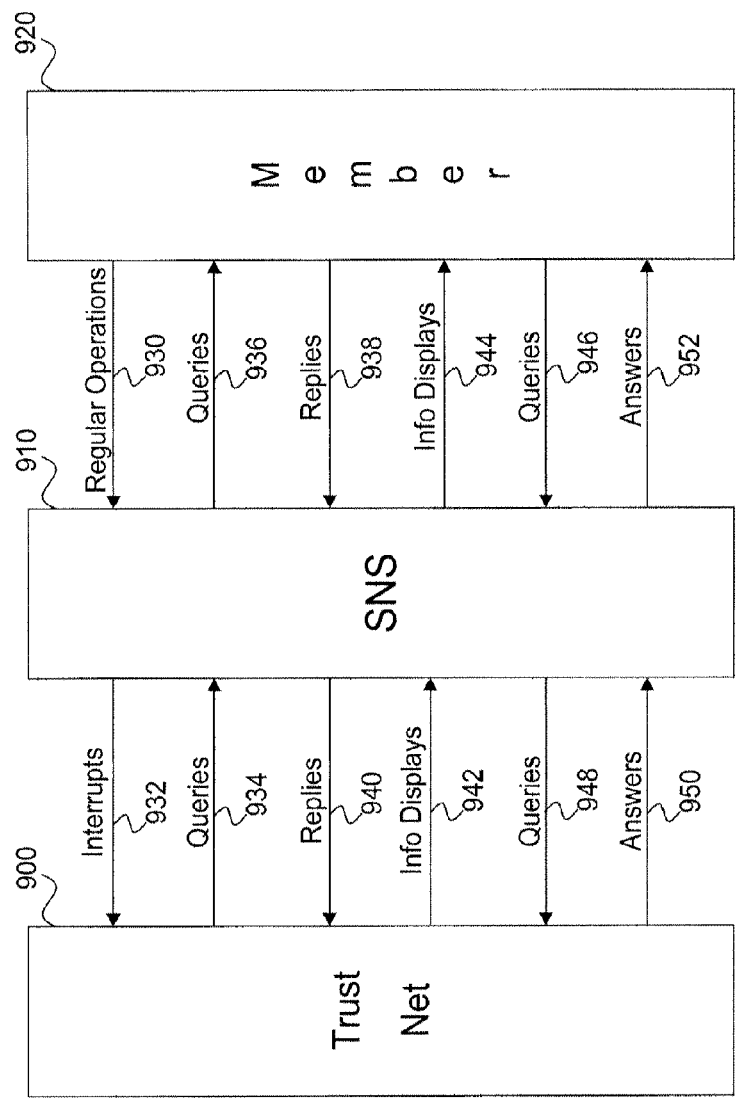
FIG. 9 is a schematic diagram of a communication diagram between embodiments of the trustnet system, a social network system and a member of the social network system.

Referring to FIG. 9, a schematic diagram is provided illustrating some electronic communications that occur between a system computer embodiment of the invention (Trustnet), labeled 900, the one or more computers comprising a social network system (SNS), labeled 910, and the various electronic clients of the members (M), labeled 920. Note that some regular operations 930 of the member and the SNS may activate interrupts 932 at SNS 910. Such an interrupt may result in the Trustnet 900 generating one or more queries 734, which may be forwarded 736 from the SNS 710 to the particular member 720. The member 720 may send a reply 738 to the SNS 710, which forwards the reply 740 the Trustnet 700. Display information 742 is then provided by the Trustnet 700 to the SNS 710, which forwards that information 744 to the particular member 720. Queries 746 are provided from the member 720 to the SNS, which forwards this data 948 to the Trustnet 900. Answers and other data 990 are provided from the Trustnet 900, to the SNS 910, which forwards this data 952 to the particular member 920. Note that the foregoing represent non-limiting examples of electronic communications that may take place between the Trustnet 900, the SNS 910, and the members 920. The embodiment of FIG. 9 shows communications between the Trustnet 900 and the member 920 being handled by the SNS 910. However, this is not limiting on the invention. One or more or all of the communications between the Trustnet 900 and the member 920 may be direct, or via another $3^{rd}$ party computer or via computers of a $3^{rd}$ party SNS.

Note that the trustnet system 900 may be implemented in a standalone computer, or via software connected by a network to the SNS computers, or may be a module or other program loaded on one or more of the SNS computers.

Figure 7:
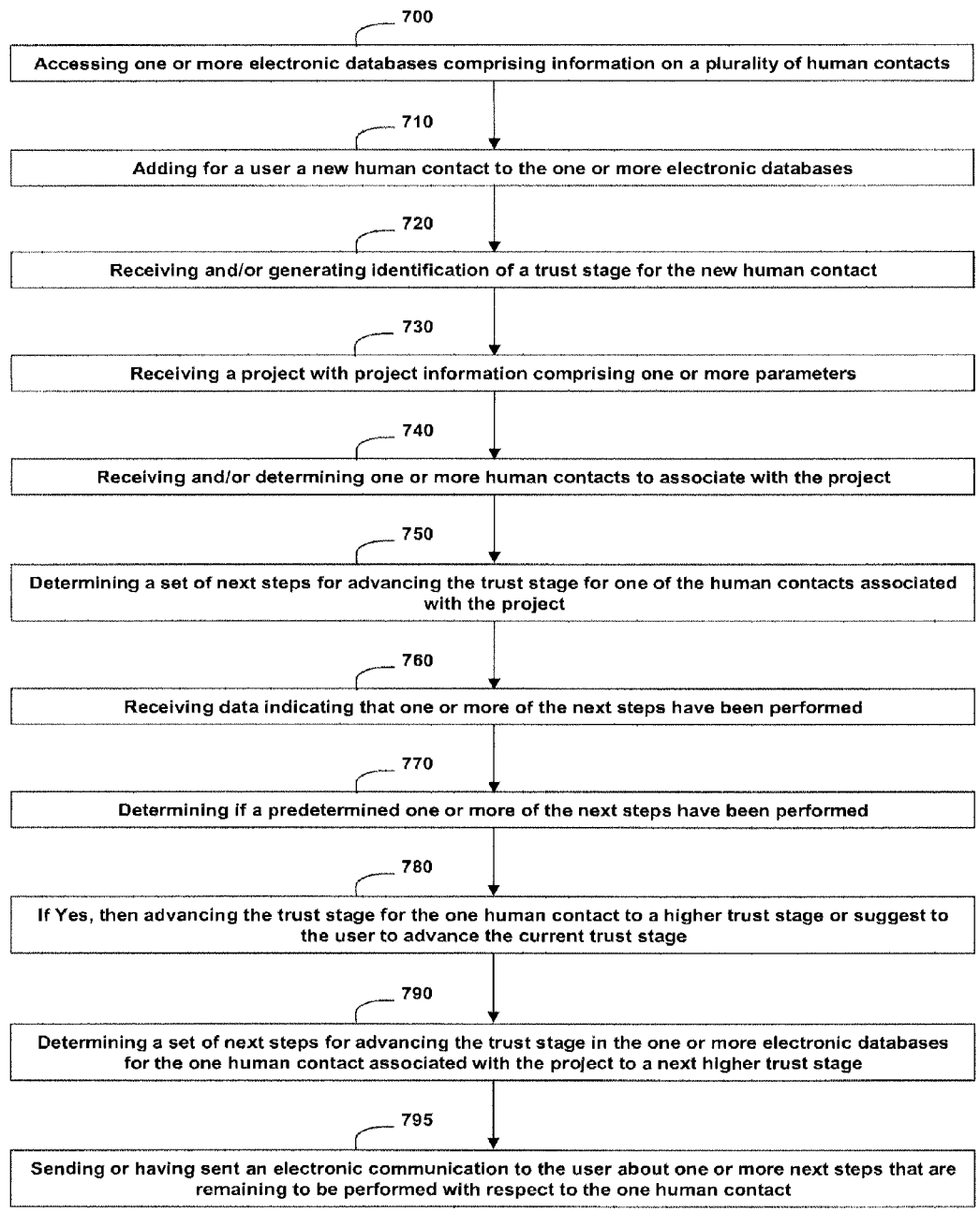
FIG. 7 is a flowchart of an embodiment of the invention.

FIG. 7 illustrative embodiments of a method for advancing a trust stage with a human contact. Referring to the figure, block 700 comprises a step of accessing as part of one or more of the following steps, using one or more computers, one or more electronic databases. The one or more databases may comprise information on a plurality of human contacts, with the information for a respective human contact comprising data on one or more selected from the group of employment information, the human contact's own respective contacts, one or more organizations to which the respective human contact is a member, a location attribute, a skill attribute, a respective trust stage of the human contact associated with a respective user, a date when the respective trust stage was reached with the respective user. Note that this is an open-ended list, and other information may also be held in the database. Note that the one or more of the databases may be external to the trustnet system and/or the social network system.

Block 710 comprises an operation of adding for a user, using the one or more computers, a new human contact to the one or more electronic databases in response to an electronic input. Note that the data for the new human contact may be obtained from the new user, or from the social network system, or from another source. The source of the data is not limiting on the invention. Additionally, the new human contact data may be received electronically over a network, and/or may be received by telephone, and/or facsimile and/or by mail, and then keyed or scanned into one or more of the databases.

Block 720 comprises an operation of receiving and/or generating, using the one or more computers, identification of a trust stage for the new human contact, wherein there are a plurality of trust stages reflecting increasing levels of trust between the user and the human contact. In embodiments, this trust stage identification may be received from a user selection, and/or may be generated based on various data in one or more of the databases, and/or may be generated by the trustnet system receiving responses to a plurality of questions, and determining the trust stage based on a logic tree. For example, see the logic tree of FIG. 2.

Block 730 represents an operation of receiving, using the one or more computers, a project with project information comprising one or more parameters. Examples of projects have been provided previously, but are limiting on the invention. In embodiments, this project information may be received from the user, or from another source with which the user is associated, such as an employer or particular group. In embodiments, a project may be obtained from the trustnet or the social network system, by scanning for a new calendar entry, or other new data entry of the user. In embodiments, a page and/or query may be presented to the user to create a new project in response to receiving data for a new calendar entry, or other new data entry of the user. As noted, project information may be received electronically over a network, and/or may be received by telephone, and/or facsimile and/or by mail, and then keyed or scanned into one or more of the databases.

Block 740 represents an operation of receiving and/or determining, using the one or more computers, one or more human contacts to associate with the project. In embodiments, this human contact association with the project may be received from the user, or from another source with which the user is associated, and/or may be generated by the trustnet and/or the social network system or another system based at least in part on data of the user, and/or on data of a human contact of the user, and/or on data of a human contact of the human contact of the user (a second level contact in a chain of contacts), and/or on data of a human contact of the human contact of the human contact of the user (a third level contact in a chain of contacts), etc. In embodiments, the trustnet or other system may search the data of the user and/or the other contacts noted to look for a match of that data to a parameter of the respective project. As noted, this human contact association with the project may be received electronically over a network, and/or may be received by telephone, and/or facsimile and/or by mail, and then keyed or scanned into one or more of the databases.

Block 750 represents an operation of determining, using the one or more computers, for the user a set of next steps for advancing the trust stage in the one or more electronic databases, for one of the human contacts associated with the project, from a current trust stage to a higher trust stage. In embodiments, these next steps may be determined based at least in part on the identification in the system of a current trust stage for this human contact. An example set of next steps is shown in the screen shots of FIGS. 12 and 14.

Block 760 represents an operation of receiving, using the one or more computers, data indicating that one or more of the next steps has been performed. This data may be recorded in the one or more databases as a next step performed in order to advance to a higher trust stage. In embodiments, receipt of the next step performance data may trigger a counter to advance one count for the number of steps performed to date to advance to a higher trust stage level.

Block 770 represents an operation of determining, using the one or more computers, if a predetermined one or more of the next steps have been performed. In operations, this step may be performed by comparing a count held in a counter or register of how many next steps have been performed to a predetermined number, e.g., six. In embodiments, this step may be performed by determining whether one or more predetermined very high value next steps have been performed.

Block 780 represents an operation of, if it has been determined that the predetermined one or more of the next steps has been performed, then using the one or more computers, to advance the trust stage for the one human contact with respect to the user in the one or more electronic databases to a higher trust stage or suggest to the user to advance the current trust stage to a new higher trust stage.

Block 790 represents an operation of determining, using the one or more computers, for the user a set of next steps for advancing the trust stage in the one or more electronic databases, for the one human contact associated with the project, from the new higher trust stage to a next higher trust stage. This step is similar to the operation of block 750, except that the current trust stage is now at a higher trust stage level.

Block 795 represents an operation of sending or having sent, using the one or more computers and one or more networks, an electronic communication to the user about one or more next steps that are remaining to be performed with respect to the one human contact, when a predetermined time period has elapsed and/or based on one or more parameters. In embodiments, the electronic communication may be an email communication, and/or a text message, and/or an instant message, communicated to a personal computer, and/ or a cell phone, and/or a portable pad-type computer, and/or any other type of appliance capable of receiving an electronic message. The trigger for generating the electronic communication may be an elapsed time, such as 10 days after a last user communication with the human contact, and/or a predetermined time remaining until the occurrence of an event. In embodiments, the trigger for the electronic communication may be based on a data entry in the one or more databases. For example, there may be a link to a user's electronic calendar function, or to the electronic calendar function of a human contact of the user, or data may have been entered by the user or the user's human contact, for a group meeting that the user or the human contact may be attending and/or a calendar entry indicating that the user or the human contact will or has traveled to a particular location. In embodiments, a search may be performed of the one of more databases on a periodic basis for one or more of the parameters entered for a project of the user.

In embodiments, the trustnet system may determine one or more human contacts associated in the one or more databases with the group meeting or the particular location of the user or the user's human contact. In embodiments, the trustnet system may then determine from a list one or more next steps remaining to be performed for these determined one or more human contacts based at least in part on the current trust stage between the user and the human contact, and send or have sent an electronic communication to the user about the one or more next steps that are remaining to be performed for these determined one or more human contacts.

Figure 8:
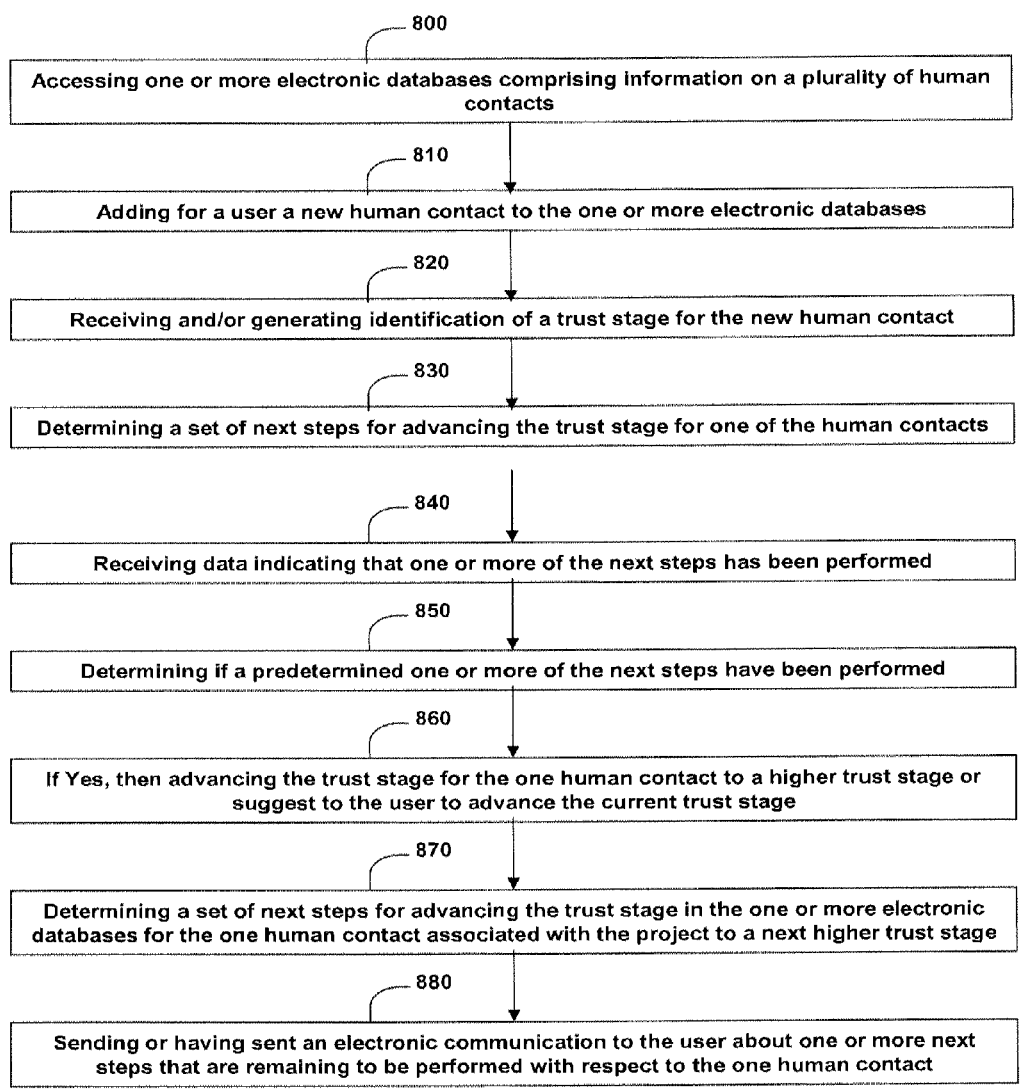
FIG. 8 is a flowchart of an embodiment of the invention.

FIG. 8 is similar to FIG. 7, except that no project is associated with advancement of human contact trust stages. Block 800 comprises a step of accessing as part of one or more of the following steps, using one or more computers, one or more electronic databases. As noted, the one or more databases may comprise information on a plurality of human contacts, with the information for a respective human contact comprising data on one or more selected from the group of employment information, the human contact's own respective contacts, one or more organizations to which the respective human contact is a member, a location attribute, a skill attribute, a respective trust stage of the human contact associated with a respective user, a date when the respective trust stage was reached with the respective user.

Block 810 comprises an operation of adding for a user, using the one or more computers, a new human contact to the one or more electronic databases in response to an electronic input.

Block 820 comprises an operation of receiving and/or generating, using the one or more computers, identification of a trust stage for the new human contact, wherein there are a plurality of trust stages reflecting increasing levels of trust between the user and the human contact. In embodiments, this trust stage identification may be received from a user selection, and/or may be generated based on various data in one or more of the databases, and/or may be generated by the trustnet system receiving responses to a plurality of questions, and determining the trust stage based on a logic tree. For example, see the logic tree of FIG. 2.

Block 830 represents an operation of determining, using the one or more computers, for the user a set of next steps for advancing the trust stage in the one or more electronic databases, for one of the human contacts, from a current trust stage to at least a next higher trust stage. In embodiments, these next steps may be determined based at least in part on the identification in the trustnet system of a trust stage for this human contact and from a list associated in the one or more databases with that trust stage. An example set of next steps is shown in the screen shots of FIGS. 12 and 14.

Block 840 represents an operation of receiving, using the one or more computers, data indicating that one or more of the next steps has been performed. This data would be recorded in the one or more databases as a next step performed in order to advance to a higher trust stage.

Block 850 represents an operation of determining, using the one or more computers, if a predetermined one or more of the next steps have been performed. In operations, this step may be performed by comparing a count held in a counter or register of how many next steps have been performed to a predetermined number, e.g., six. In embodiments, this step may be performed by determining whether one or more predetermined high value next steps have been performed.

Block 860 represents an operation of, if it has been determined that the predetermined one or more of the next steps has been performed, then using the one or more computers, to advance the trust stage for the one human contact with respect to the user in the one or more electronic databases to a higher trust stage or to suggest to the user to advance the current trust stage to a new higher trust stage.

Block 870 represents an operation of determining, using the one or more computers, for the user a set of next steps for advancing the trust stage in the one or more electronic databases, for the one human contact associated with the project, from the new higher trust stage to a next higher trust stage. This step is similar to the operation of block 830, except that the current trust stage is now at a higher trust stage level.

Block 880 represents an operation of sending or having sent, using the one or more computers and one or more networks, an electronic communication to the user about one or more next steps that are remaining to be performed with respect to the one human contact, when a predetermined time period has elapsed and/or based on one or more parameters.

In embodiments, the methods of FIGS. 7 and 8 may further comprise steps of advancing a next steps count for the respective one human contact for the user when the data is received indicating that one of the next steps has been performed, and determining if the next steps count equals or exceed a predetermined number.

In embodiments, the methods of FIG. 7 may further comprise for the step of receiving and/or determining one or more human contacts to associate with the project, searching the one or more electronic databases for information for the one or more human contacts of the user for information that matches at least one of the one or more parameters of the project information, and associating or suggesting to the user associating with the project, using the one or more computers, a one of the human contacts that matches one of the one or more parameters of the project information.

In embodiments, the methods of FIGS. 7 and 8 may further comprise for the step of receiving and/or generating of identification of a trust stage for the new human contact, providing data for electronic display to the user of a series of questions or attributes for each of a plurality of the trust stages, and providing an ability to select one of the trust stages. This ability to select may comprise a button or other indicator displayed on a user screen, for example.

In embodiments, the methods of FIGS. 7 and 8 may further comprise for the step of receiving and/or generating of identification of a trust stage for the new human contact, providing data for electronic display to the user of a series of questions for each of a plurality of the trust stages, where a trust stage is selected based on one or more answers to the series of questions. In embodiments, this selection may be made based on a logic tree, as previously described.

In embodiments, the methods of FIGS. 7 and 8 may further comprise sending or having sent an electronic communication to the user about one or more next steps that are remaining to be performed for multiple human contacts of the user.

In embodiments, as noted, the methods of FIGS. 7 and 8 may further comprise for the step of sending or having sent an electronic communication to the user about one or more next steps, selecting one or more human contact based at least in part on calendar data for a group meeting that the user or a human contact of the user may be attending and/or based at least in part on data indicating that the user and/or the human contact of the user will or has traveled to a particular location, and generating next steps for the respective one or more human contacts.

In embodiments, the methods of FIGS. 7 and 8 may further comprise generating and making accessible electronically, using the one or more computers, a list of human contacts at a selected trust level.

In embodiments, as noted, the methods of FIGS. 7 and 8 may further comprise generating and making accessible electronically, using the one or more computers, a list of human contacts, with a number of next steps performed or to be performed for each of multiple of the human contacts.

In embodiments, as noted, the methods of FIGS. 7 and 8 may further comprise making accessible electronically, using the one or more computers, a plurality of video and/or audio and/or text tutorials on methods to increase a trust stage with a human contact.

In embodiments, as noted, the methods of FIGS. 7 and 8 may further comprise receiving, using the one or more computers, from the user a proposed next step associated with a trust stage higher than a current trust stage with one of the human contacts. The trustnet system may then determine a level of risk and/or value for the proposed next step, and provide data for display of a level of risk and/or value, using the one or more computers, of taking the proposed next step associated with the trust stage higher than the current trust stage with the one human contact. In embodiments, the determining a level of risk and/or value for the proposed next step, may be obtained by accessing a table in the one or more databases listing risks and value for taking an action normally not taken as a next step to advance to a next higher level.

Figure 10:
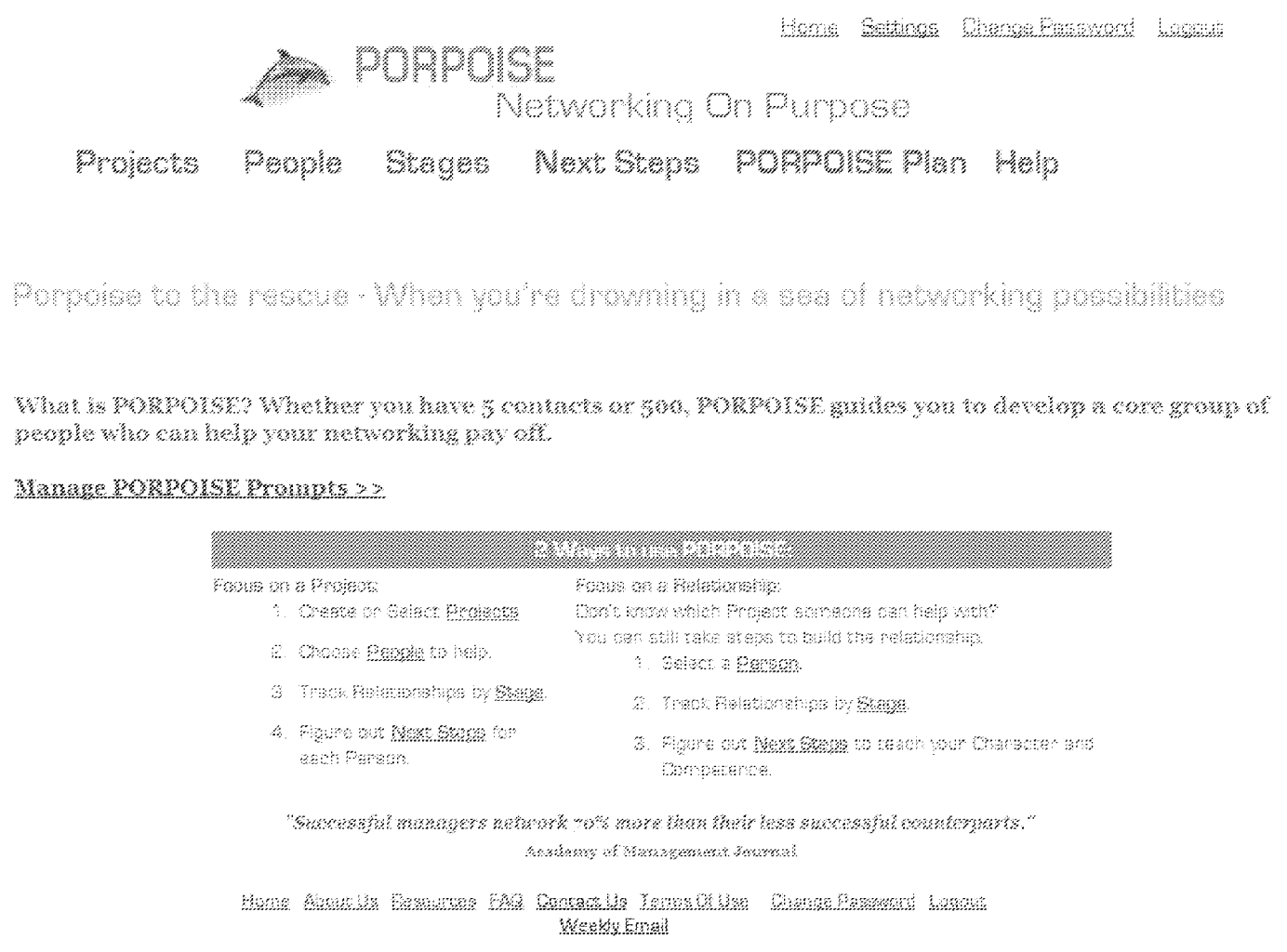

Example screenshots are provided to illustrate embodiments of the invention. FIG. 10 is a screenshot of a Home Page for embodiments of the invention. In embodiments of this home page, the available features of the trustnet system may be provided with hot links to open pages and/or activate the respective feature.

FIG. 11 is a screenshot of a New Contacts Page. Note the hot spot to "Add Person." The page may also list new contacts. Note that on the example page shown, the respective trust stage, any projects for the respective new contact, and any next steps for the new contact have not yet been identified.

Figure 12:
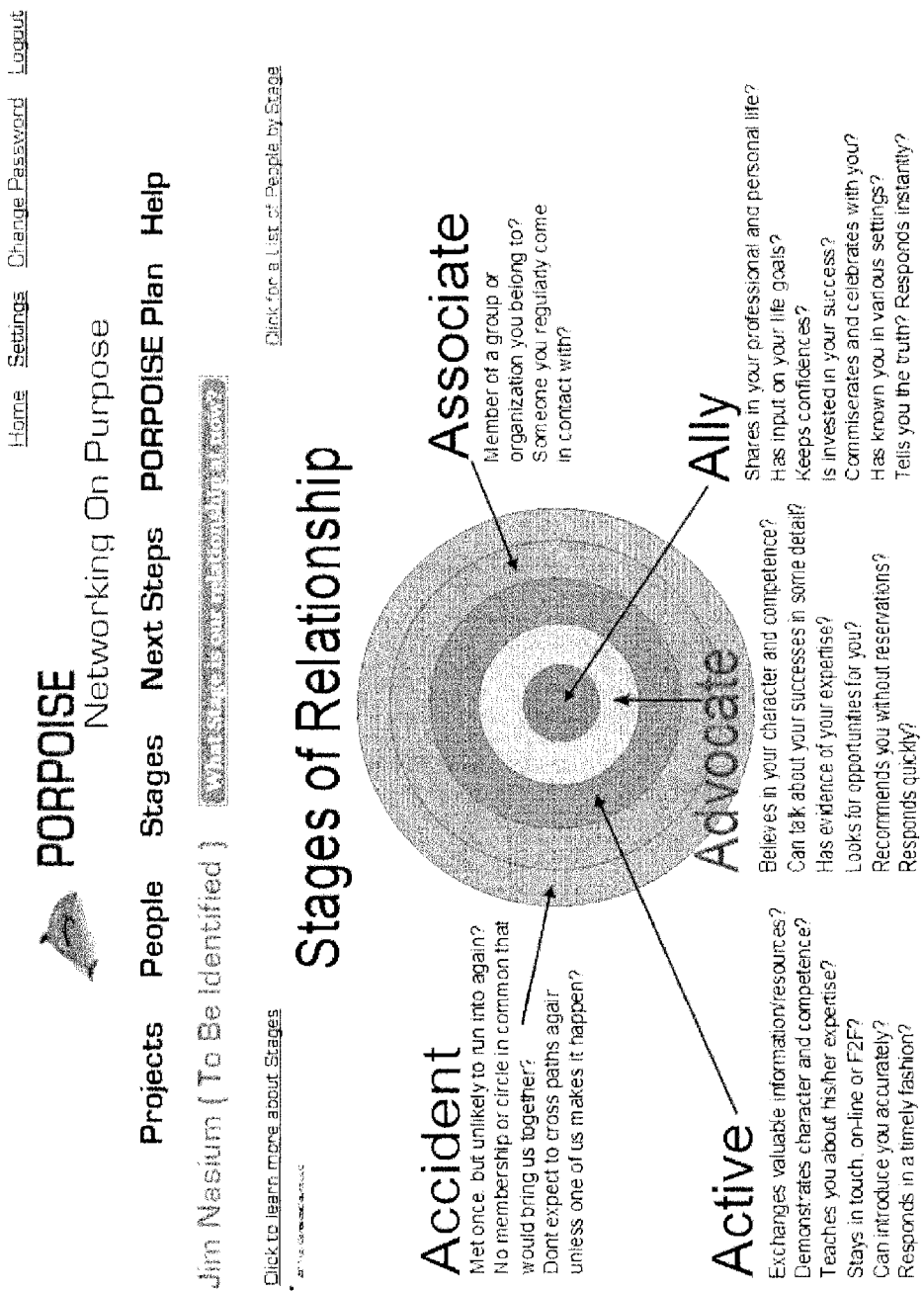
FIG. 12 is a screenshot of a trust stage identification page.

FIG. 12 is a screenshot of a trust stage identification page. For the new contact "Jim Nasium," there is a hot spot on the page labeled "What Stage is our relationship at now?" Clicking on this hot spot, in embodiments, may bring up a question. An answer to the question may result in bringing up another question. Answers to a series of these questions may result in showing a proposed trust stage for the relationship with Jim Nasium. In embodiments, the "Click to learn more about Stages" hot spot may be used to link to a tutorials page. In embodiments, clicking on one of the trust stages in the lower half of the page may allow the user to automatically assign the trust stage for the contact.

Figure 13:
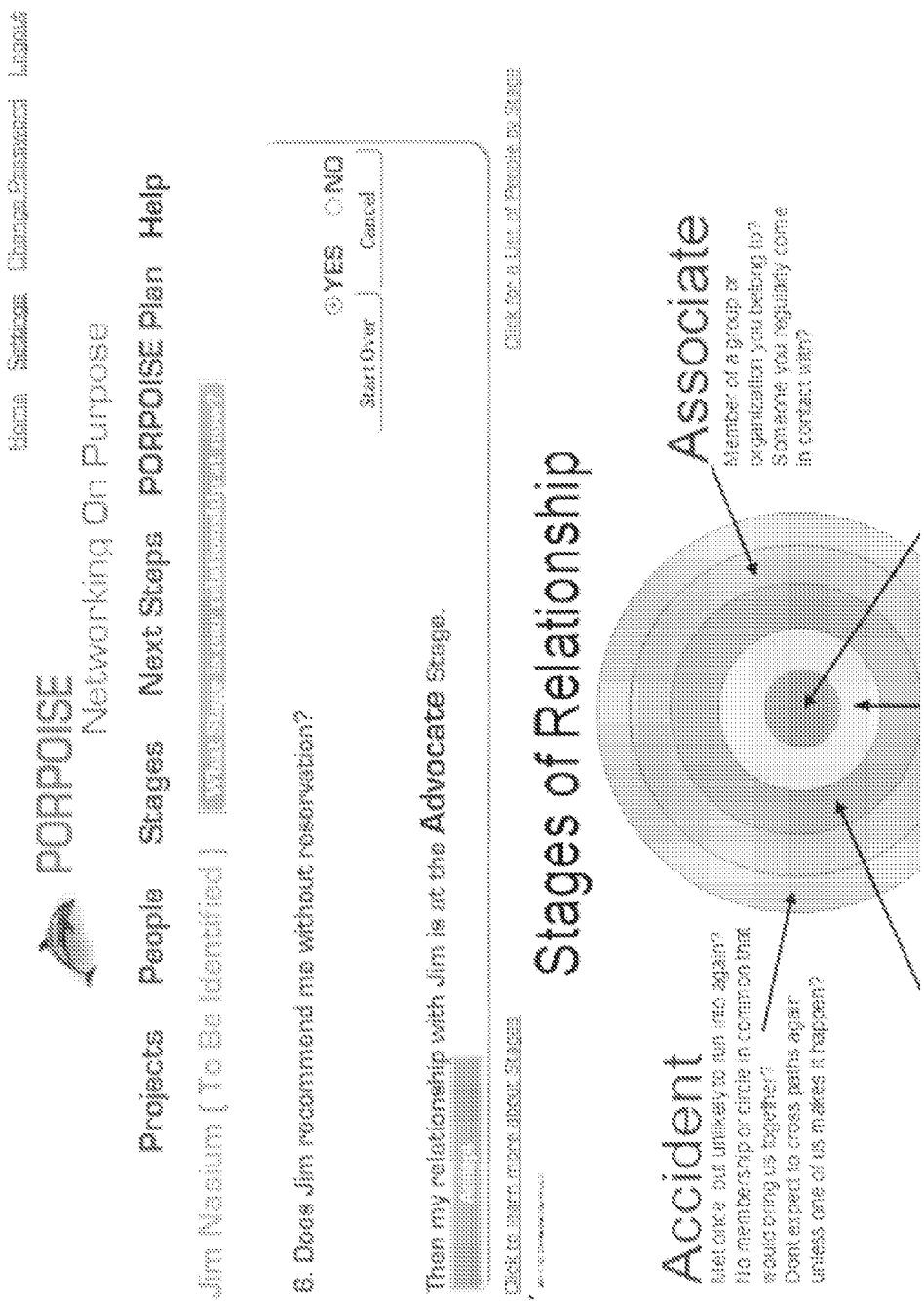
FIG. 13 is a screenshot of a stage identification question.

FIG. 13 is a screenshot of a stage identification question. The page represents diamond 6 in FIG. 2. The user may click "Yes" or "No" for the answer. In embodiments, the system may propose trust stage as "Advocate." The user may click an "Accept" button to accept this as the current trust stage for Jim Nasium.

Figure 14:
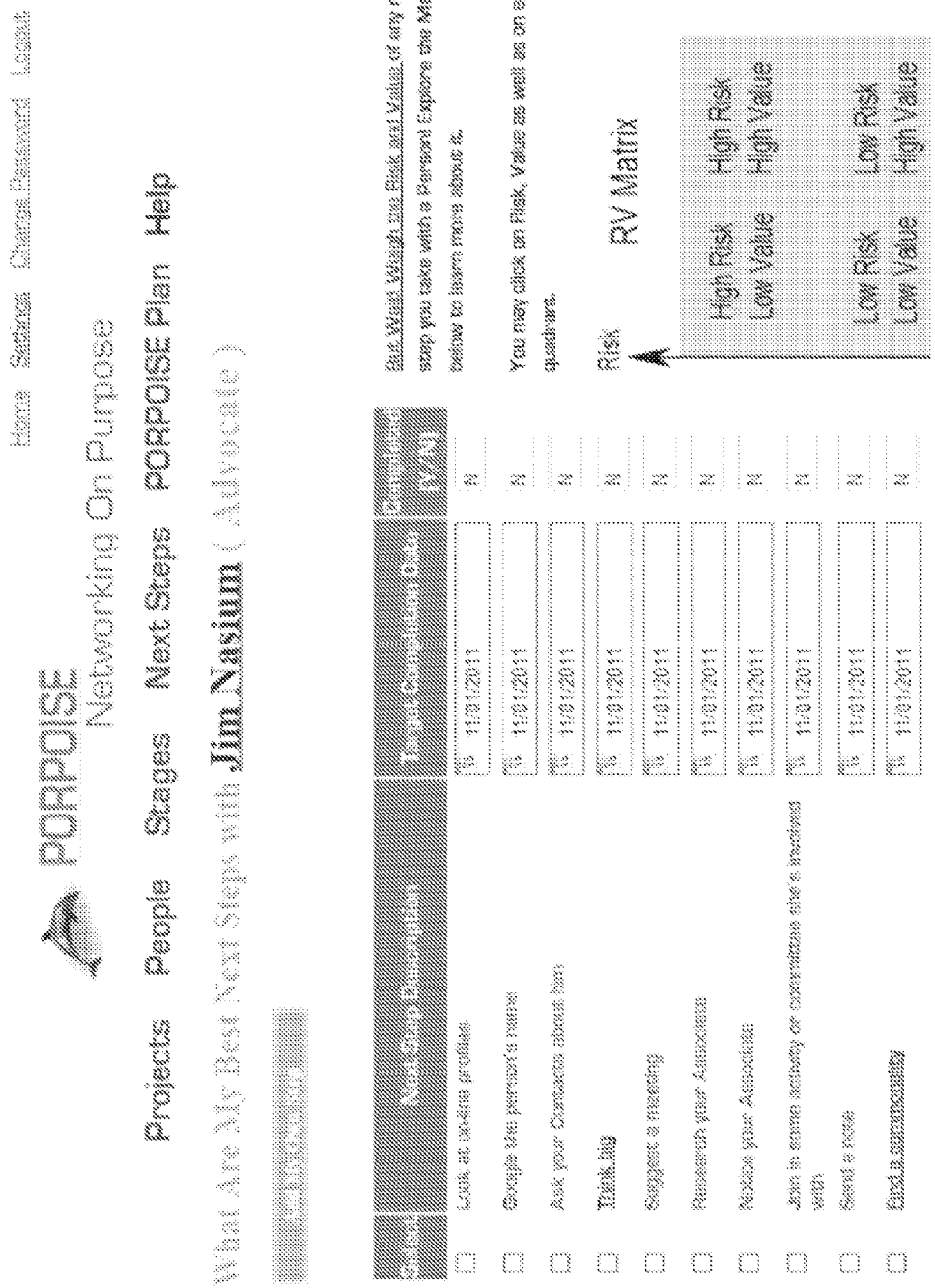
FIG. 14 is a screenshot of a next steps page for a given human contact.

FIG. 14 is a screenshot of a next steps page for a given human contact. In embodiments, a Target Completion Date field may be provided and a Completed field, for the user. The user may also add his own next steps for this human contact by clicking on the link "Add My Own Step." In embodiments, a section of the page may also comprise links to one or more tutorials on risk for a given next step and a potential value of a given next step. Additionally, proposing a next step that is not recommended to advance to the next higher trust stage may trigger a link and/or a display of information about risk and/or value. In embodiments, such information may be obtained from a table of risks and values for various next steps, and/or links to tutorials in the trustnet system and/or external to the trustnet system.

Figure 15:
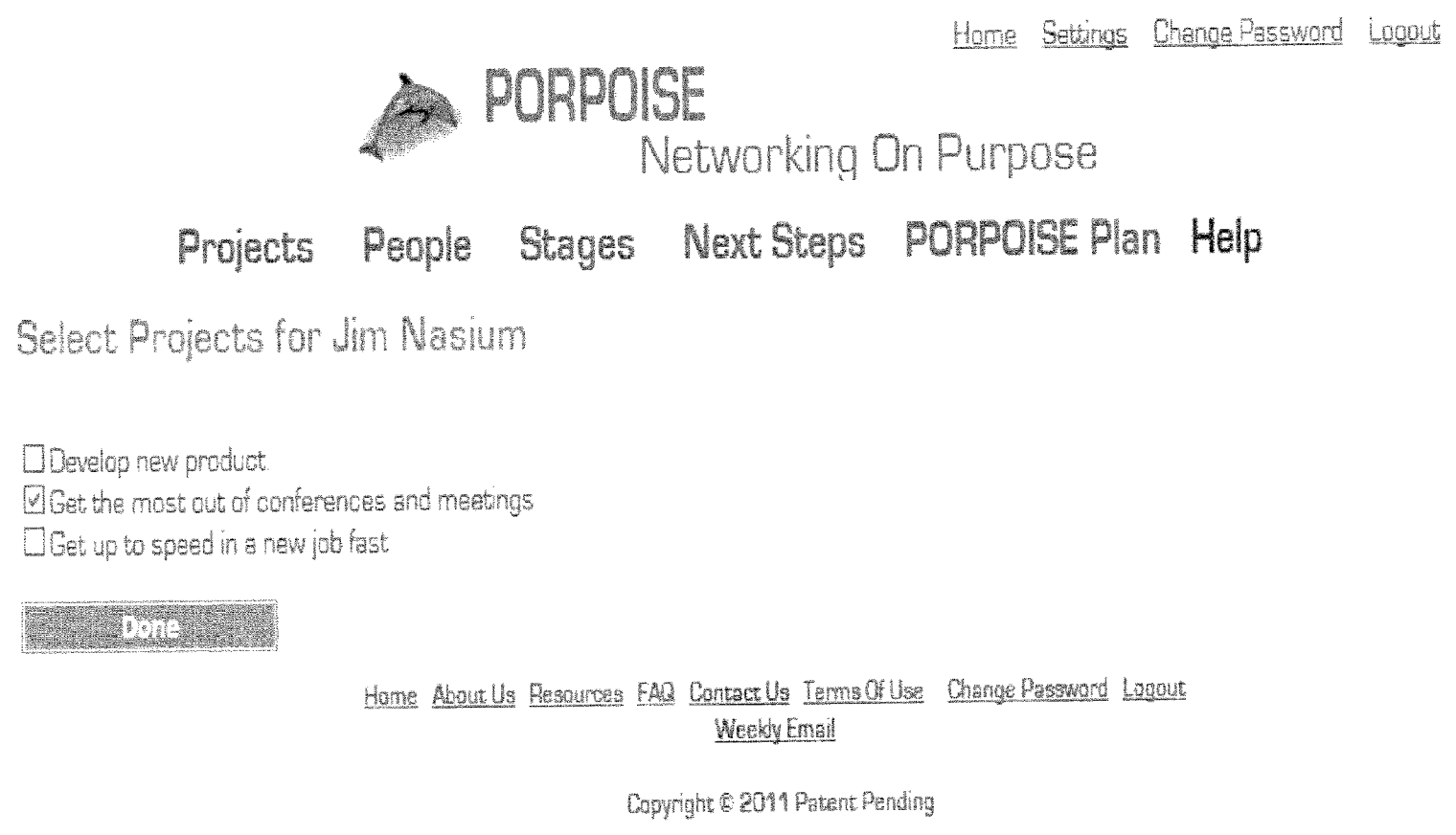

FIG. 15 is a screenshot of a select projects page for a human contact. This page lists projects that may be selected for contact Jim Nasium.

Figure 16:
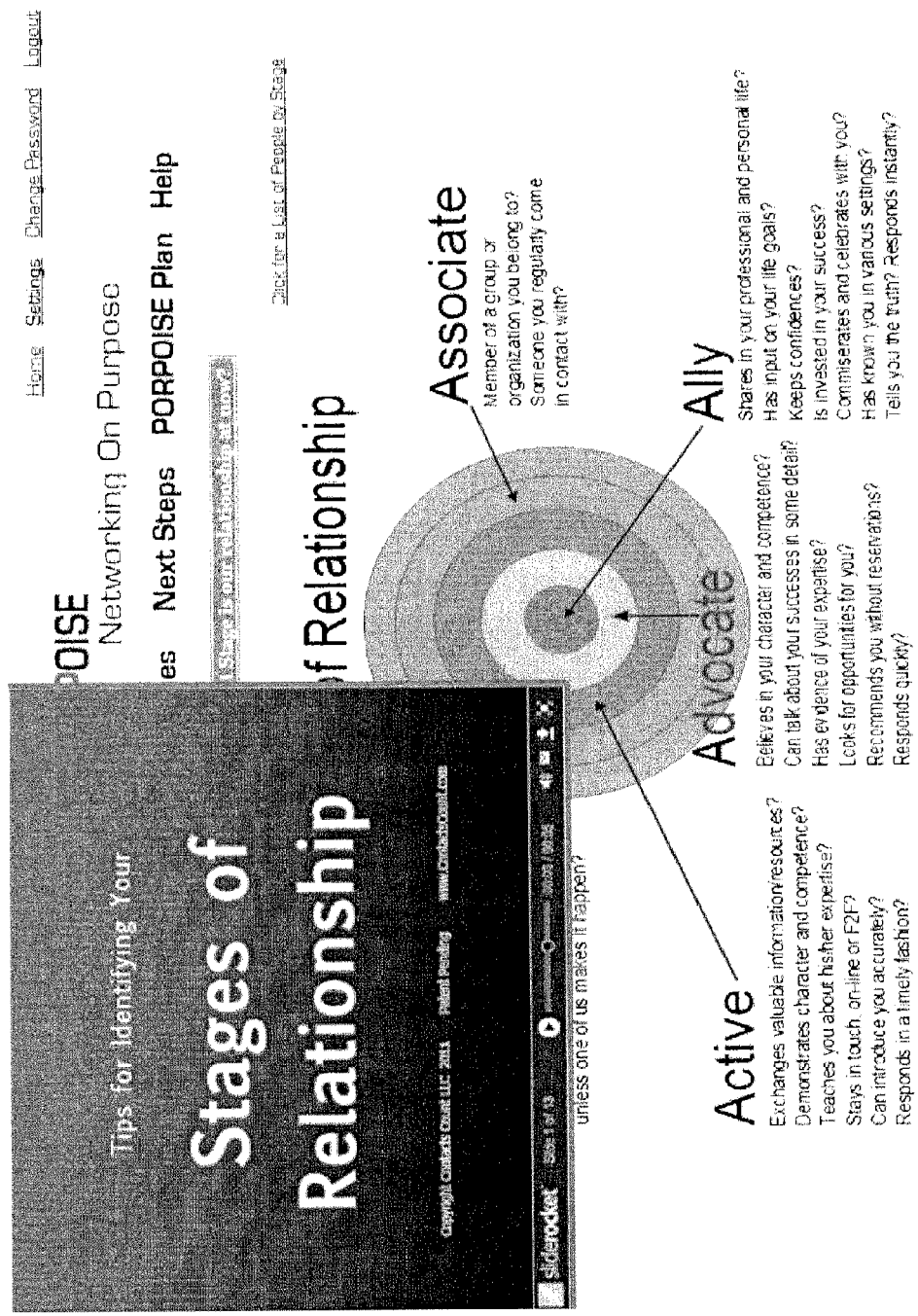
FIG. 16 is a screenshot of a tutorial presentation page.

FIG. 16 is a screenshot of a tutorial presentation page for accessing a tutorial.

Figure 17:
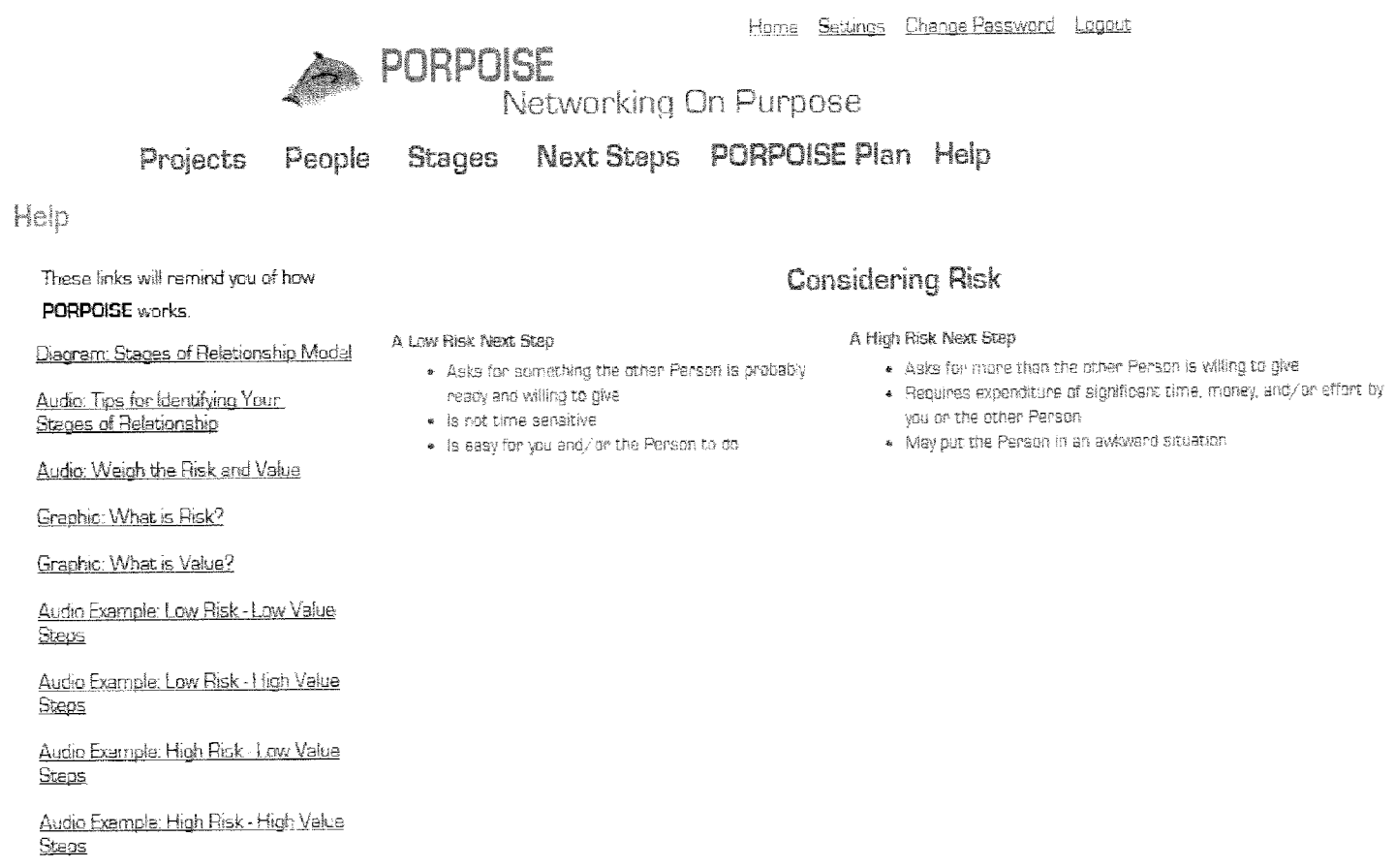

FIG. 17 is a screenshot of a help and a risk page. In embodiments, the page lists tutorials available by clicking the Help link. In embodiments, one or more tutorials may also be made available by clicking a Risk link on one of the pages.

Figure 18:
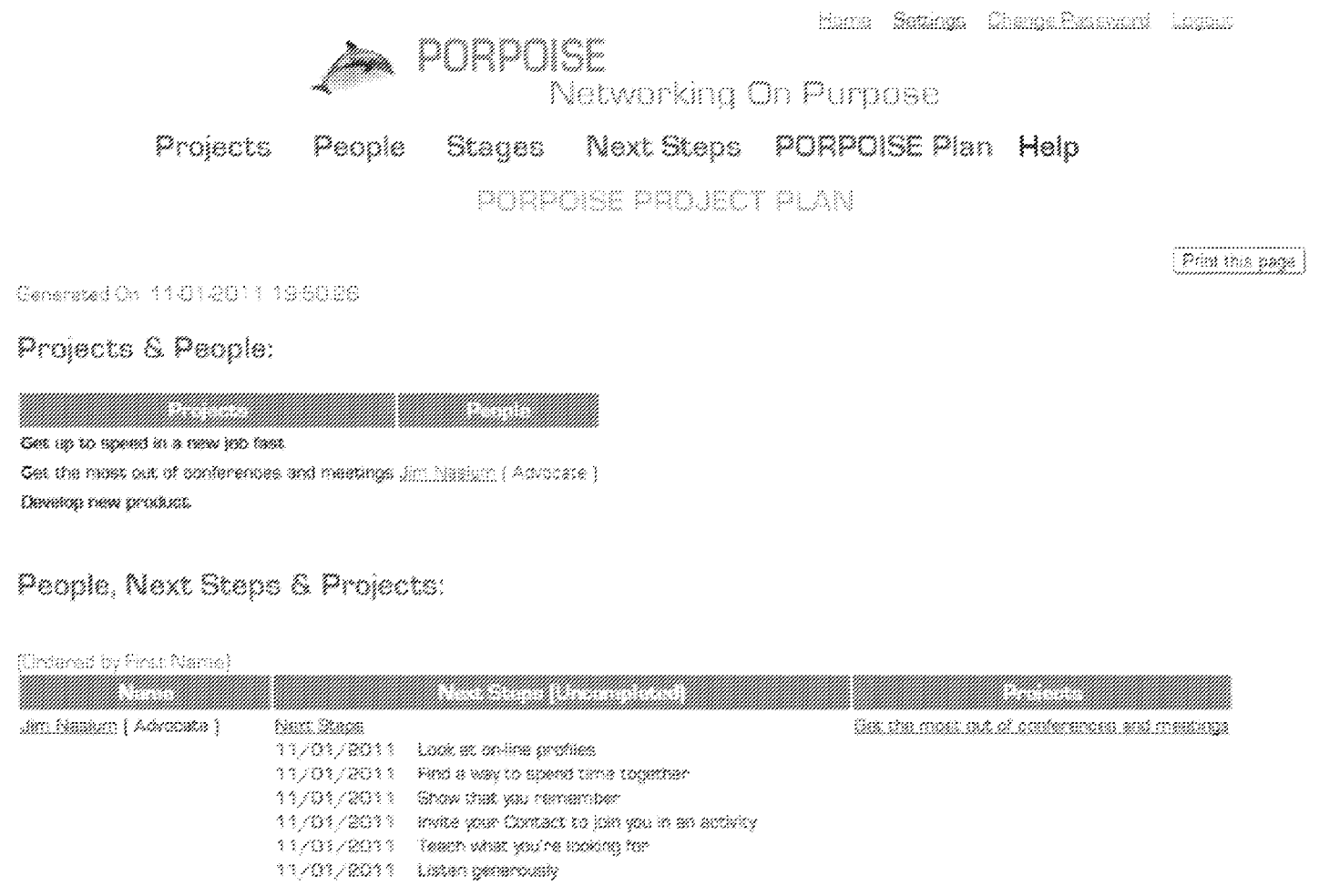

FIG. 18 is a screenshot of a page for next steps for a given human contact to advance a project. In embodiments, this listing of next steps for Jim Nasium in order to advance a project may be electronically communicated, for example, to a cell phone, pad-type computer, or other user electronic communication device.

In embodiments, the trustnet system may uses internal logic (Flowcharts 2-4):
1. To assist the user in identifying the Stage of his/her relationship with a Contact,
2. To use that Stage as the selector to recommend "Next Steps" to move the relationship along,
3. To count completed "Next Steps" and recommend Stage Advancements.

The present invention may be implemented in a variety of different and overlapping embodiments. For example, in embodiments, the trustnet system may comprise a stand-alone package, and/or an add-on to another network, such as a social network system. In some embodiments, buy in software may be provided to load on a individual's computer or other electronic communication device. In embodiments, the trustnet software may be made accessible to individuals and/or social network system members from a "cloud" site to which users may subscribe and transfer in their contacts from other sites.

Figure 5:
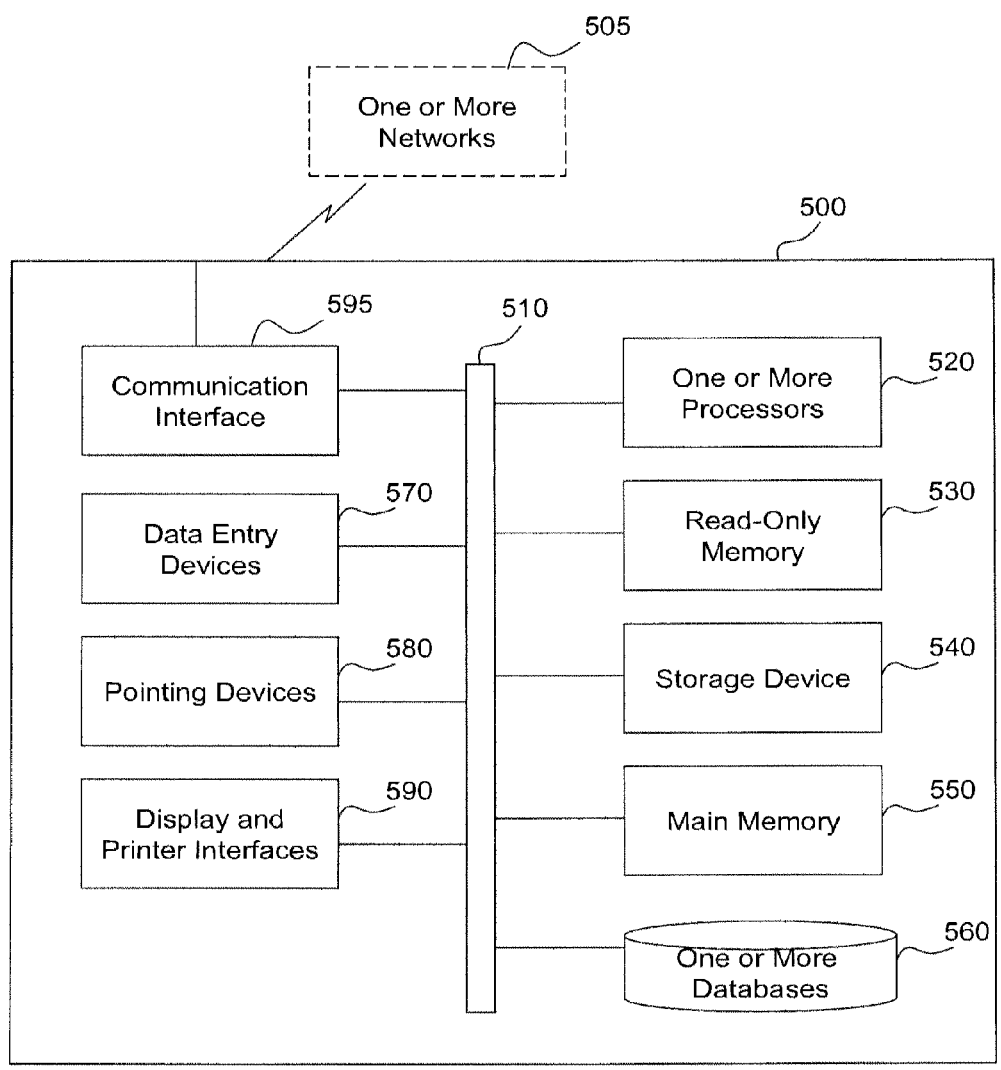
FIG. 5 is a schematic diagram of a computer configuration that may be used to implement embodiments of the invention.

FIG. 5 is a block diagram showing an embodiment of a computer system that may be used for implementations, generally designated by reference number 500 in FIG. 5. In embodiments, the system 500 may be communicatively coupled to one or more networks 505 via a communication interface 595. The one or more networks 505 may represent a generic network, which may correspond to a local area network (LAN), a wireless LAN, an Ethernet LAN, a token ring LAN, a wide area network (WAN), the Internet, a proprietary network, an intranet, a telephone network, a wireless network, to name a few, and any combination thereof. Depending on the nature of the network employed for a particular application, the communication interface 595 may be implemented accordingly. The network 505 serves the purpose of delivering information between connected parties.

In embodiments, the Internet may comprise the network 505. The system 500 may also or alternatively be communicatively coupled to a network 505 comprising a closed network (e.g., an intranet). The system 500 may be configured to communicate, via the one or more networks 505, with respective computer systems of the one or more entities.

The system 500 may comprise, in embodiments, a computing platform for performing, controlling, and/or initiating computer-implemented operations, for example, via a server and the one or more networks 505. The computer platform may comprise system computers and other party computers. The system 500 may operate under the control of computer-executable instructions to carry out the process steps described herein. Computer-executable instructions comprise, for example, instructions and data which cause a general or special purpose computer system or processing device to perform a certain function or group of functions. Computer software for the system 500 may comprise, in embodiments, a set of software objects and/or program elements comprising computer-executable instructions collectively having the ability to execute a thread or logical chain of process steps in a single processor, or independently in a plurality of processors that may be distributed, while permitting a flow of data inputs/outputs between components and systems.

The system 500 may be include, one or more personal computers, workstations, notebook computers, servers, mobile computing devices, handheld devices, multi-processor systems, networked personal computers, minicomputers, mainframe computers, personal data assistants, Internet appliances (e.g., a computer with minimal memory, disk storage and processing power designed to connect to a network, especially the Internet, etc.), or controllers, to name a few.

The system 500 may comprise, in embodiments, a bus 510 or other communication component that couples the various system elements 520-595, and is configured to communicate information between the various system elements 520-595.

As shown in FIG. 5, one or more computer processors 520 may be coupled with the bus 510 and configured to process and handle information and execute instructions. The system 500 may include a main memory 550, such as a Random Access Memory (RAM) or other dynamic storage device, coupled to the bus 500, for storing information and instructions to be executed by the one or more processors 520. The main memory 550 also may be used for storing temporary variables or other intermediate information during execution of instructions by the one or more processors 520.

The system 500 further may include a Read-Only Memory (ROM) 530 or other static storage device (e.g., EPROM, EAROM, EEPROM, PROM, flash, and the like) coupled to the bus 510 for storing static information and instructions for the one or more processors 520. Furthermore, a storage device 540, such as a magnetic disk or optical disk, such as a CD-ROM or other optical media may be provided and coupled to the bus 510 for storing information and instructions.

In addition to the ROM 530, one or more databases 560 may be coupled to the bus 510 for storing static information and software instructions. Information stored in or maintained in the database 560 may be provided in conformance with a database system format such as, but not limited to, the Structured Query Language (SQL) format. Database query and access instructions, for example, in the form of one or more scripts, may be used which, when executed by a processor such as the processor 520, serve to access, store and retrieve data maintained in the database 560 according to the instructions contained in the script.

Furthermore, the system 500 may comprise application software instructions which may implement a user interface portion for generating interactive pages or display screens by which a user may provide data to and receive information from the system 500 and the database 560 using a human-machine interface. Interactive pages may include user dialog boxes for accepting user entered information. In particular, the human-machine interface may comprise a Graphical User Interface (GUI) portion for prompting the user to enter data by providing an interactive dialog box or message box instructing the user to enter particular data, or to select from among a multitude of options provided using a pull-down menu. A user may interact with the system 500 via the graphical user interface by using a pointing device and/or data entry device. The GUI portion may place the output of the system 500 in a format for presentation to a user via the display. In at least one embodiment, the GUI may be implemented as a sequence of Java instructions.

A data entry device 570, including alphanumeric and other keys, or a pointing device such as a mouse or trackball, or a scanner, to name a few, may be coupled to the bus 510 for communicating information and command selections to the processor 520. The data entry device 570 may be coupled to the bus 510 via an interface (not shown), wherein the interface may be, for example, a serial port, an RS-232 port, or the like. In addition, the interface may be a wireless interface and provide connection-less communication via, for example, Bluetooth communication.

The system 500 may be coupled via the bus 510 to a display or printer 590 for outputting information to a computer user. In addition, a user may use the display (e.g., touch screen) or printer (e.g., scanner) to provide information to the system 500.

According to at least one embodiment, the various program operations as described herein may be provided by the system 500 in response to the one or more processors 520 executing one or more sequences of computer-readable instructions contained in the main memory 550. Such instructions may be read into the main memory 550 from another computer-readable medium, such as the ROM 530, the storage device 540, or the database 560. Execution of the sequences of instructions contained in the main memory 550 may cause the one or more processors 520 to perform the process steps described herein. It should be appreciated that an embodiment of the system 500 may perform fewer or additional processes as compared to those described herein. As noted, the one or more processors 520 may be arranged in a multi-processing arrangement. Alternatively, hard-wired circuitry may be used in place of or in combination with software instructions to implement the invention. Thus, embodiments of the invention are not limited to any specific combination of hardware circuitry and software.

Embodiments include program products comprising machine-readable media with machine-executable instructions or data structures stored thereon. Such machine-readable media can be any available storage media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other storage medium which can be used to store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention have been described in the general context of method steps which may be implemented in embodiments by a program product including machine-executable instructions, such as program code, for example in the form of program modules executed by machines in networked environments. Generally, program modules include routines, programs, objects, components, data structures, etc., that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced with one or multiple computers in a networked environment using logical connections to one or more remote computers (including mobile devices) having processors. Logical connections may include a local area network (LAN) and a wide area network (WAN) that are presented here by way of example and not limitation. Such networked environments are commonplace in office-wide or enterprise-wide computer networks, and include intranets and the Internet, and may use a wide variety of different communication protocols. Those skilled in the art will appreciate that such network computing environments will typically encompass many types of computer system configurations, including personal computers, hand-held devices such as mobile phones and other PDA appliances, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired and wireless links) through a communications network. In a distributed computing environment, program modules may be located in both local and remote memory storage devices.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations. It should also be noted that the phrase "a plurality" is intended to mean more than one, and is not intended to refer to any previous recitation of the word "plurality," unless preceded by the word "the."

All components, modes of communication, and/or processes described heretofore are interchangeable and combinable with similar components, modes of communication, and/or processes disclosed elsewhere in the specification, unless an express indication is made to the contrary. It is intended that any structure or step disclosed herein may be combined with other structure and or method embodiments to form a new embodiment with this added element or step.

All components, modes of communication, and/or processes described heretofore are interchangeable and combinable with other components, modes of communication, and/or processes disclosed elsewhere in the specification, unless an express indication is made to the contrary. It is intended that any structure or step disclosed herein may be combined with other structure and or method embodiments to form a new embodiment with this added element or step.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

We claim:

1. A method for user advancing a trust stage with a project human contact, comprising:

accessing as part of one or more of the following steps, using one or more computers, one or more electronic databases comprising information on a plurality of respective human contacts, with the information for a respective one of the human contacts comprising data on one or more selected from the group of employment information, the respective human contact's own respective contacts, one or more organizations to which the respective human contact is a member, a location attribute, a skill attribute, a respective trust stage of the respective human contact associated with a respective person, a date when the respective trust stage was reached with the respective person;

receiving, using the one or more computers, a project with project information comprising one or more parameters;

receiving and/or determining, using the one or more computers, the project human contact to associate with the project;

receiving and/or generating, using the one or more computers, identification of a trust stage for the project human contact, wherein there are a plurality of trust stages reflecting increasing levels of trust between the user and the project human contact;

determining, using the one or more computers, for the user a set of next steps for advancing the trust stage in the one or more electronic databases, for the project human contact associated with the project, from a current trust stage to a next higher trust stage;

receiving, using the one or more computers, data indicating that one or more of the next steps has been performed;

determining, using the one or more computers, if a predetermined one or more of the next steps have been performed;

if the predetermined one or more of the next steps has been performed, then using the one or more computers, to advance the trust stage for the project human contact with respect to the user in the one or more electronic databases to the next higher trust stage or suggest to the user to advance the current trust stage to the next new higher trust stage;

determining, using the one or more computers, for the user a set of next steps for advancing the trust stage in the one or more electronic databases, for the project human contact associated with the project, from the next higher trust stage to an even higher trust stage; and sending or having sent, using the one or more computers and one or more networks, an electronic communication to the user about one or more next steps that are remaining to be performed with respect to the project human contact, when a predetermined time period has elapsed and/or based on one or more parameters.

2. The method as defined in claim 1, further comprising:
advancing a next steps count for the respective project human contact for the user when the data is received indicating that one of the next steps has been performed, and
wherein the determining if a predetermined one or more of the next steps has been performed comprises determining if the next steps count equals or exceed a predetermined number.

3. The method as defined in claim 1, wherein the receiving and/or determining the project human contact to associate with the project comprises:
searching the one or more electronic databases for information for the human contacts of the user and/or their respective contacts for information that matches at least one of the one or more parameters of the project information;
associating or suggesting to the user associating with the project, using the one or more computers, a one of the human contacts that matches one of the one or more parameters of the project information.

4. The method as defined in claim 3, further comprising:
advancing a next steps count for the respective project human contact for the user when the data is received indicating that one of the next steps has been performed, and
wherein the determining if a predetermined one or more of the next steps have been performed comprises determining if the next steps count equals or exceed a predetermined number.

5. The method as defined in claim 1, wherein the receiving and/or generating of identification of a trust stage for the project human contact step comprises providing data for electronic display to the user of a series of questions or attributes for each of a plurality of the trust stages, and an ability to select one of the trust stages.

6. The method as defined in claim 1, wherein the receiving and/or generating of identification of a trust stage for the project human contact step comprises providing data for electronic display to the user of a series of questions for each of a plurality of the trust stages, where a trust stage is selected, using the one or more computers, based on one or more answers to the series of questions.

7. The method as defined in claim 1, wherein the sending or having sent an electronic communication to the user about one or more next steps that are remaining to be performed is performed for multiple project human contacts of the user.

8. The method as defined in claim 1, wherein the step of sending or having sent an electronic communication to the user about one or more next steps is based at least in part on calendar data for a group meeting that the user or the project human contact may be attending and/or based at least in part on data indicating that the user and/or the project human contact will or has traveled to a particular location, and generating next steps for the respective project human contact based thereon.

9. The method as defined in claim 1, further comprising:
generating and making accessible electronically, using the one or more computers, a list of other human contacts at a selected trust level.

10. The method as defined in claim 1, further comprising:
generating and making accessible electronically, using the one or more computers, a list of other human contacts, with a number of next steps performed or to be performed for each of multiple of the other human contacts.

11. The method as defined in claim 1, further comprising:
making accessible electronically, using the one or more computers, a plurality of video and/or audio and/or text tutorials on methods to increase a trust stage with the project human contact.

12. The method as defined in claim 1, further comprising:
receiving, using the one or more computers, from the user a proposed next step associated with a trust stage higher than a current trust stage with the project human contact;
providing a level of risk and/or value from an electronic table, using the one or more computers, of taking the proposed next step associated with the trust stage higher than the current trust stage with the project human contact.

13. The method as defined in claim 11, wherein the sending or having sent an electronic communication to the user about one or more next steps that are remaining to be performed with respect to the project human contact comprises:
electronically searching or having searched, using the one or more computers, the one or more databases in response to an entry in an electronic calendar for a group meeting that the user or the project human contact may be attending and/or on a calendar entry indicating that the user or the project human contact will or has traveled to a particular location;
determining, using the one or more computers, one or more other human contacts associated in the one or more databases with the group meeting or the particular location; and
generating, using the one or more computers, one or more next steps remaining to be performed for these determined one or more other human contacts; and
sending or having sent an electronic communication to the user about the one or more next steps that are remaining to be performed for these determined one or more other human contacts.

14. A system for a user advancing a trust stage with a project human contact, comprising:
one or more computers configured with programming code to perform the following steps:
accessing as part of one or more of the following steps, using the one or more computers, one or more electronic databases comprising information on a plurality of respective human contacts, with the information for a respective one of the human contacts comprising data on one or more selected from the group of employment information, the respective human contact's own respective contacts, one or more organizations to which the respective human contact is a member, a location attribute, a skill attribute, a respective trust stage of the respective human contact associated with a respective person, a date when the respective trust stage was reached with the respective person;
receiving, using the one or more computers, a project with project information comprising one or more parameters;
receiving and/or determining, using the one or more computers, the project human contact to associate with the project;

receiving and/or generating, using the one or more computers, identification of a trust stage for the project human contact, wherein there are a plurality of trust stages reflecting increasing levels of trust between the user and the project human contact;

determining, using the one or more computers, for the user a set of next steps for advancing the trust stage in the one or more electronic databases, for the project human contact associated with the project, from a current trust stage to a next higher trust stage;

receiving, using the one or more computers, data indicating that one or more of the next steps has been performed;

determining, using the one or more computers, if a predetermined one or more of the next steps have been performed;

if the predetermined one or more of the next steps has been performed, then using the one or more computers, to advance the trust stage for the project human contact with respect to the user in the one or more electronic databases to the next higher trust stage or suggest to the user to advance the current trust stage to the next higher trust stage;

determining, using the one or more computers, for the user a set of next steps for advancing the trust stage in the one or more electronic databases, for the project human contact associated with the project, from the next higher trust stage to an even higher trust stage; and sending or having sent, using the one or more computers and one or more networks, an electronic communication to the user about one or more next steps that are remaining to be performed with respect to the project human contact, when a predetermined time period has elapsed and/or based on one or more parameters.

15. The system as defined in claim 14, further comprising the one or more computers configured to perform the steps of:
advancing a next steps count for the respective project human contact when the data is received indicating that one of the next steps has been performed, and
wherein the determining if a predetermined one or more of the next steps has been performed comprises determining if the next steps count equals or exceed a predetermined number.

16. The system as defined in claim 14, wherein the one or more computers are configured for the receiving and/or determining the project human contact to associate with the project step to perform the steps:
searching the one or more electronic databases for information for the human contacts of the user and/or their respective contacts for information that matches at least one of the one or more parameters of the project information;
associating or suggesting to the user associating with the project as the project human contact, using the one or more computers, a one of the human contacts that matches one of the one or more parameters of the project information.

17. The system as defined in claim 14, wherein the one or more computers are configured for the receiving and/or generating of identification of a trust stage for the project human contact step to perform the step of providing data for electronic display to the user of a series of questions for each of a plurality of the trust stages, and selecting a trust stage based on one or more answers to the series of questions.

18. The system as defined in claim 14, wherein the one or more computers are configured for the sending or having sent an electronic communication to the user about one or more next steps that are remaining to be performed for multiple human contacts of the user.

19. The system as defined in claim 14, wherein the one or more computers are configured for the sending or having sent an electronic communication to the user about one or more next steps that are remaining to be performed with respect to the project human contact, to perform the steps:
electronically searching the one or more databases in response to an entry in an electronic calendar for a group meeting that the user or the project human contact may be attending and/or on calendar entry indicating that the user or the project human contact will or has traveled to a particular location;
determining one or more other project human contacts associated in the one or more databases with the group meeting or the particular location; and
generating one or more next steps remaining to be performed for these determined one or more other project human contacts; and
sending or having sent an electronic communication to the user about the one or more next steps that are remaining to be performed for these determined one or more other project human contacts.

20. The system as defined in claim 14, wherein the one or more computers are further configured to perform the steps:
receiving, using the one or more computers, from the user a proposed next step associated with a trust stage higher than a current trust stage with the project human contact; and
providing a level of risk and/or value from an electronic table, using the one or more computers, of taking the proposed next step associated with the trust stage higher than the current trust stage with the project human contact.

* * * * *